United States Patent [19]

Woods et al.

[11] Patent Number: 4,491,908
[45] Date of Patent: Jan. 1, 1985

[54] MICROPROGRAMMED CONTROL OF EXTENDED INTEGER AND COMMERCIAL INSTRUCTION PROCESSOR INSTRUCTIONS THROUGH USE OF A DATA TYPE FIELD IN A CENTRAL PROCESSOR UNIT

[75] Inventors: William E. Woods, Natick; Philip E. Stanley, Westboro, both of Mass.

[73] Assignee: Honeywell Information Systems Inc., Waltham, Mass.

[21] Appl. No.: 326,442

[22] Filed: Dec. 1, 1981

[51] Int. Cl.³ .............................................. G06F 9/26
[52] U.S. Cl. ...................................................... 364/200
[58] Field of Search ... 364/200 MS File, 900 MS File, 364/749

[56] References Cited
U.S. PATENT DOCUMENTS 4,021,655  5/1977  Healey et al. .................... 364/749
4,128,876 12/1978  Ames et al. ...................... 364/200
4,236,206 11/1980  Strecker et al. ................... 364/200
4,241,397 12/1980  Strecker et al. ................... 364/200
4,309,753  1/1982  Negi et al. ........................ 364/200
4,384,340  5/1983  Tague et al. ...................... 364/736

Primary Examiner—Charles E. Atkinson
Assistant Examiner—Mark P. Watson
Attorney, Agent, or Firm—George Grayson; Nicholas Prasinos

[57] ABSTRACT

A data processing system includes a microprogram controlled central processing unit that executes instructions. The instruction words include a data type field for identifying the type of operand processed during the execution of the instruction. The data type field signals and a number of control signals are applied to the address terminals of a read only memory. The read only memory output signals are tested by microwords of a microprogram to branch to firmware routines to process the operand type.

5 Claims, 14 Drawing Figures

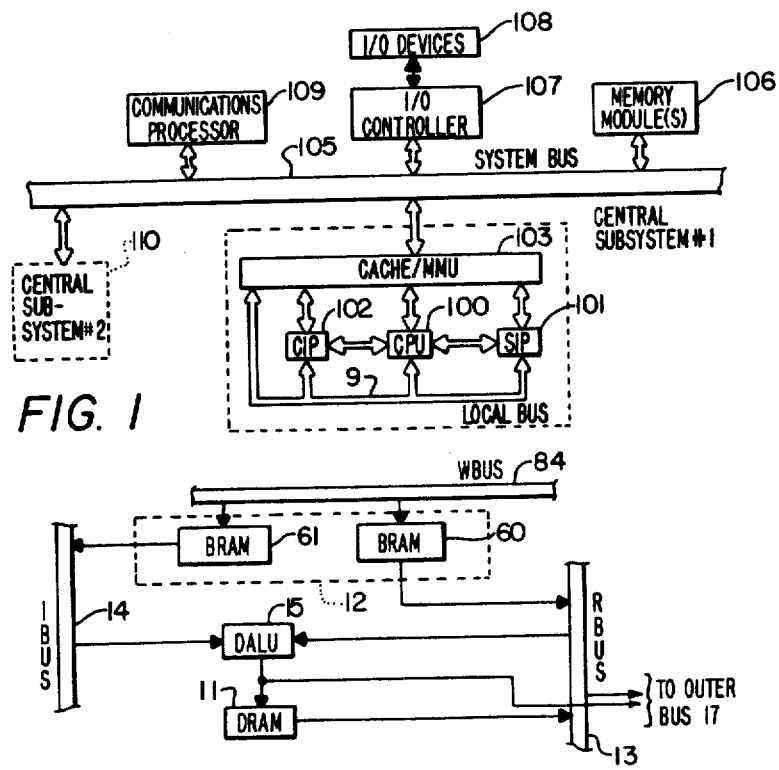
FIG. 1
FIG. 3
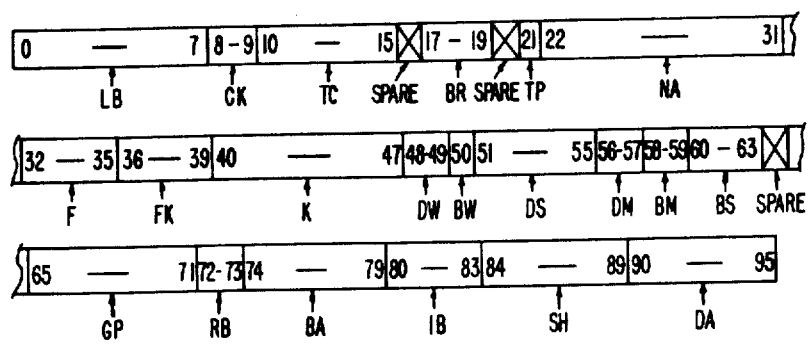
FIG. 4

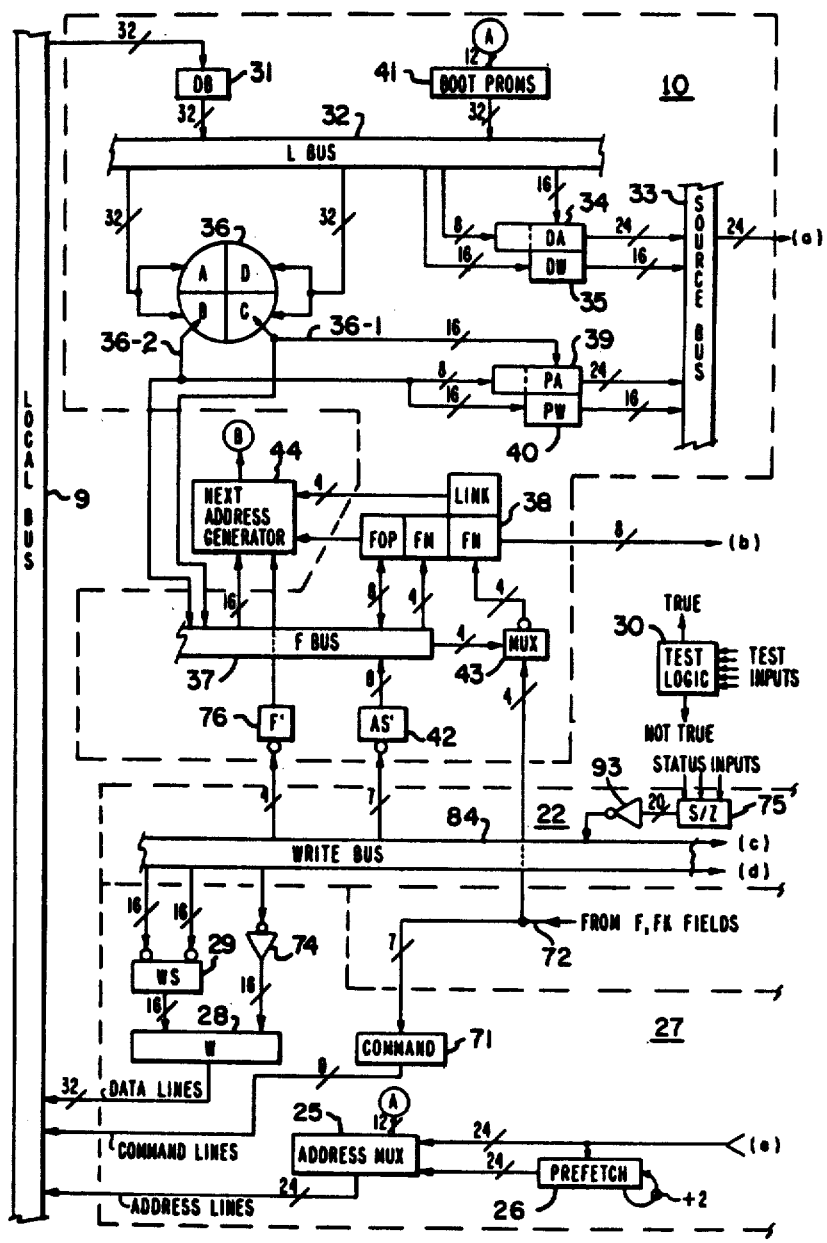
FIG. 2 SHEET 1 OF 2

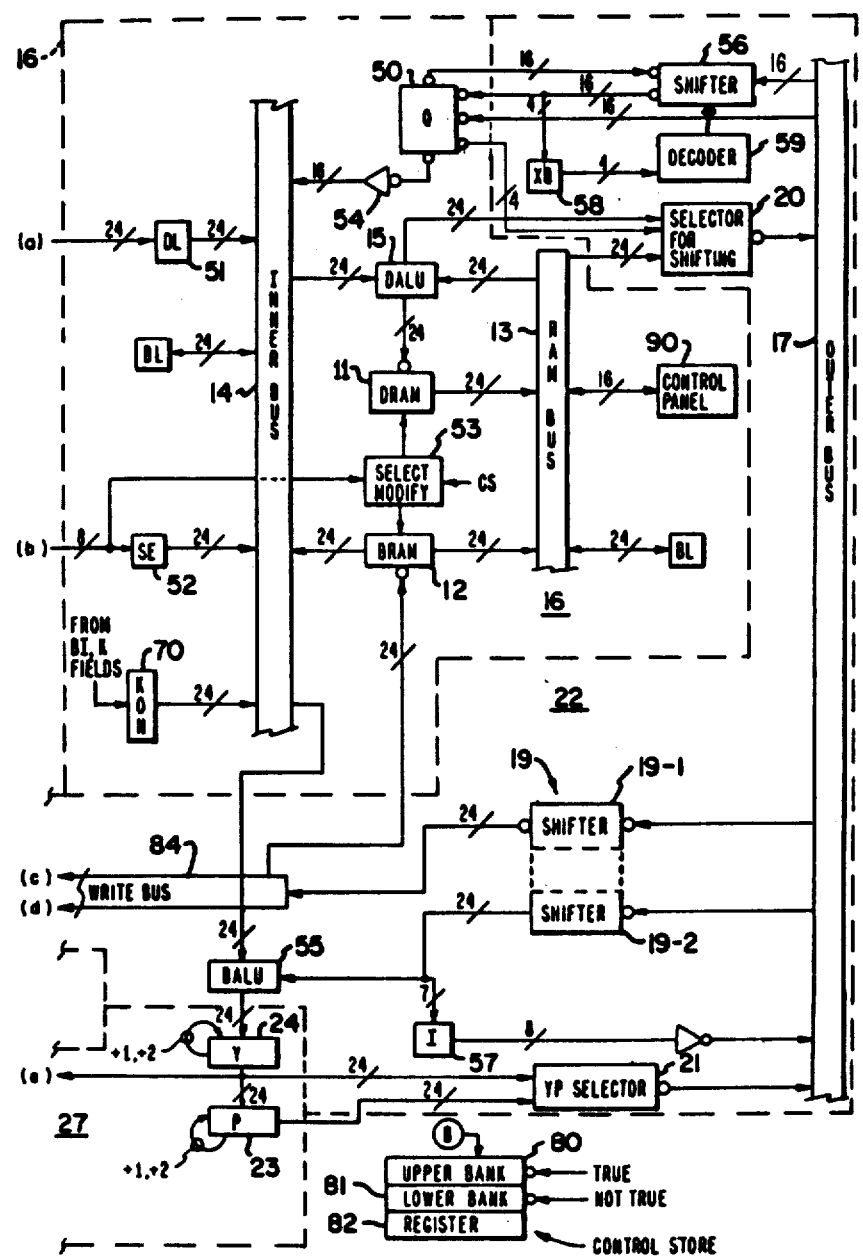
FIG. 2  SHEET 2 OF 2

| DATA TYPE BITS 4 5 6 7 | MEMORY OPERAND | IMO | = Kn | REG |
|---|---|---|---|---|
| X 0 0 0 | U BIT STRING | ILLEGAL | ILLEGAL | ILLEGAL |
| X 0 0 1 | S BIT STRING | " | " | " |
| 0 0 1 0 | ILLEGAL | " | " | " |
| 0 0 1 1 | " | " | " | " |
| 0 1 0 0 | U HALF WORD | U WORD | " | " |
| 0 1 0 1 | S HALF WORD | S WORD | " | " |
| 0 1 1 0 | U WORD | ILLEGAL | " | U WORD |
| 0 1 1 1 | S WORD | " | " | S WORD |
| 1 0 0 0 | ILLEGAL | S DOUBLE WORD | S DOUBLE WORD | S DOUBLE WORD |
| 1 0 0 1 | S DOUBLE WORD | ILLEGAL | ILLEGAL | ILLEGAL |
| 1 1 0 0 | ILLEGAL | " | " | " |
| 1 1 0 1 | " | " | " | " |
| 1 1 1 0 | ADDRESS | ADDRESS | ADDRESS | ADDRESS (B REG) |
| 1 1 1 1 | ILLEGAL | ILLEGAL | ILLEGAL | ILLEGAL |

X = LEAST SIGNIFICANT BIT OF BS LENGTH FIELD
o U = UNSIGNED ⟶ 0 EXTENDED TO 32 BITS
o S = SIGNED ⟶ SIGN EXTENDED TO 32 BITS

FIG. 6

| m \ n | 0 | 1-7 | 8 | 9-B | C | D-F |
|---|---|---|---|---|---|---|
| 0 | IMA | Bn | @IMA | @B(n-8) | | |
| 1 | IMA+R1 | Bn+R1 | @IMA+R1 | @B(n-8)+R1 | | |
| 2 | IMA+R2 | Bn+R2 | @IMA+R2 | @B(n-8)+R2 | | |
| 3 | IMA+R3 | Bn+R3 | @IMA+R3 | @B(n-8)+R3 | | |
| 4 | P+D | Bn+D | @[P+D] | @[B(n-8)+D] | | |
| 5 | RFU | REG | RFU | B(n-8)+↓R1 | AS23 | B(n-C)+R1↑ |
| 6 | FT or FT | ↓Bn | FT+D | B(n-8)+↓R2 | EI11 | B(n-C)+R2↑ |
| 7 | IMO | Bn↑ | IV+D | B(n-8)+↓R3 | EII23 | B(n-C)+R3↑ |

ADDRESS SYLLABLE MAP I

FIG. 7

| n<br>m | 0 | 1-7 | 8 | 9-F |
|---|---|---|---|---|
| 0 | REMOTE DESCRIPTOR | Bn+D+0 | P+D+0 | @[B(n-8)+D]+0 |
| 1 | | Bn+D+R1+0 | P+D+R1+0 | @[B(n-8)+D]+R1+0 |
| 2 | | Bn+D+R2+0 | P+D+R2+0 | @[B(n-8)+D]+R2+0 |
| 3 | | Bn+D+R3+0 | P+D+R3+0 | @[B(n-8)+D]+R3+0 |
| 4 | | Bn+D+R4+0 | @[P+D]+0 | @[B(n-8)+D]+R4+0 |
| 5 | | Bn+D+R5+0 | AS3 | @[B(n-8)+D]+R5+0 |
| 6 | | Bn+D+R6+0 | P+$\triangle$+0 | @[B(n-8)+D]+R6+0 |
| 7 | | Bn+D+R7+0 | IM0 | @[B(n-8)+D]+R7+0 |

ADDRESS SYLLABLE MAP 2

*FIG. 8*

| m \ n | 0 | 1-3 | 4-7 | 8 | 9-F |
|---|---|---|---|---|---|
| 0 | REMOTE DESCRIPTOR | FT+D+Rn+0 | | @FT+0↑ | RFU |
| 1 | | Bn+D+K1+0 | | RFU | |
| 2 | | Bn+D+K2+0 | | | |
| 3 | | Bn+D+K3+0 | | | |
| 4 | | @[FT+D]+Rn+0 | | @[FT+D]+0 | |
| 5 | | =Kn | | RFU | |
| 6 | | RFU | | | |
| 7 | | | | | |

RFU = RESERVED FOR FUTURE USE

ADDRESS SYLLABLE MAP 3

FIG. 9

| INSTRUCTION NAME | MNEMONIC | OP CODE | DESCRIPTION | INDICATORS AFFECTED |
|---|---|---|---|---|
| INCREMENT* | KINC | C0 | [EA] ← [EA] + 1 | OV, C |
| DECREMENT* | KDEC | D0 | [EA] ← [EA] – 1 | OV, C |
| NEGATE | KNEG | E0 | [EA] ← 0 – [EA] | OV, C |
| COMPLEMENT | KCPL | F0 | [EA] ← $\overline{[EA]}$ | |
| SWAP | KSW | 98 | [EA] ⇄ [K#] | OV |

NOTE – OP CODE BIT POSITIONS 4 THROUGH 7 INDICATE THE HIGH ORDER DIGIT; BIT POSITION 8 PLUS 3 LOW ORDER ZEROS REPRESENT THE LOW ORDER DIGIT.

SINGLE OPERAND INSTRUCTIONS

FIG. 10

```
                    E  MISC6B-1                                              +
                    8  ODSIZ4+                                              B
                    4  ODSIZ2+                                             7
                    2  ODSIZ1+                                            C   -
                    1  ODADDR+                                           S   R
                                                                        I  D
    0000 0000 0000 0000  1111 1111 1111 1111   M   A              +
    ←———— AS1 OR AS2 ————→  ←———————— AS3 ————————→  M   0
                                                        E   0
    0000 0000 1111 1111  0000 0000 1111 1111   M   G              +
                                                        E   L
                                                        R   0
    0000 1111 0000 1111  0000 1111 0000 1111   F   P              +
     CIP  EII  CIP  EII   CIP  EII  CIP  EII   U   8    +    +    +    +
                                                        L   0    4    5    6    7
    0011 0011 0011 0011  0011 0011 0011 0011   P   M    0    0    0    0
                                                        R   M    M    M    M
                                                        P   R    R    R    R
    0101 0101 0101 0101  0101 0101 0101 0101   F   P    P    P    P    P
      A    B    C    D     E    F    G    H        F    F    F    F    F

..64 ..22 ..64 ..FF  ..64 ..22 ..64 ..00    0    0    0    0
    ..64 ..22 ..64 ..FF  ..64 ..22 ..64 ..00    0    0    0    1
    ..64 ..44 ..64 ..FF  ..64 ..44 ..64 ..00    0    0    1    0
    ..64 ..DD ..64 ..FF  ..64 ..DD ..64 ..00    0    0    1    1

..64 ..66 ..64 ..FF  ..64 ..66 ..64 ..00    0    1    0    0
    ..64 ..66 ..64 ..FF  ..64 ..66 ..64 ..00    0    1    0    1
    ..64 ..88 ..64 ..88  ..64 ..88 ..64 ..00    0    1    1    0
    ..64 ..88 ..64 ..88  ..64 ..88 ..64 ..00    0    1    1    1

..64 ..22 ..64 ..FF  ..64 ..22 ..64 ..00    1    0    0    0
    ..64 ..22 ..64 ..FF  ..64 ..22 ..64 ..00    1    0    0    1
    ..64 ..DD ..64 ..FF  ..64 ..DD ..64 ..00    1    0    1    0
    ..64 ..AA ..64 ..AA  ..64 ..AA ..64 ..AA    1    0    1    1

..64 ..DD ..64 ..FF  ..64 ..DD ..64 ..00    1    1    0    0
    ..64 ..CC ..64 ..FF  ..64 ..CC ..64 ..00    1    1    0    1
    ..64 ..BB ..64 ..BB  ..64 ..BB ..64 ..AA    1    1    1    0
    ..64 ..DD ..64 ..FF  ..64 ..DD ..64 ..00    1    1    1    1
```

```
    0 - ERROR                    8 - WORD
    1                            9
    2 - BIT                      A - DOUBLE
    3                            B - ADDRESS
    4 - DIGIT                    C - QUAD
    5                            D - RFU OPERAND SIZE/TYPE
    6 - HALF                     E
    7                            F - ERROR ;
```

PROM 44-2

MICROPROGRAMMED CONTROL OF EXTENDED INTEGER AND COMMERCIAL INSTRUCTION PROCESSOR INSTRUCTIONS THROUGH USE OF A DATA TYPE FIELD IN A CENTRAL PROCESSOR UNIT

RELATED APPLICATIONS

The following U.S. patent applications which are assigned to the same assignee as the instant application are related to the instant application and are incorporated herein by reference.

1. "Bus Sourcing and Shifter Control of a Central Processing Unit" by Philip E. Stanley, William E. Woods, Richard A. Lemay and David E. Cushing, having U.S. Ser. No. 326,260 and filed on Dec. 1, 1981.

2. "A Multiword Memory Data Storage and Addressing Technique and Apparatus" by David E. Cushing and Philip E. Stanley, having U.S. Ser. No. 280,720 and filed on July 6, 1981.

3. "Control Store Test Selection Logic for a Data Processing System" by William E. Woods, David E. Cushing and Philip E. Stanley, having U.S. Pat. No. 4,348,723 and issued on Sept. 7, 1982.

4. "Address Pairing Apparatus for a Control Store of a Data Processing System" by David E. Cushing and Philip E. Stanley, having U.S. Pat. No. 4,348,724 and issued on Sept. 7, 1982.

5. "Control Store Organization for a Data Processing System" by Philip E. Stanley, David E. Cushing and Donald R. Taylor, having U.S. Pat. No. 4,360,869 and issued on Nov. 23, 1982.

6. "Buffer System for Supplying Procedure Words to a Central Processor Unit" by William E. Woods, Philip E. Stanley, David E. Cushing and Richard A. Lemay, having U.S. Pat. No. 4,349,874 and issued on Sept. 14, 1982.

7. "Self-Evaluation System for Determining the Operational Integrity of a Data Processing System" by Elmer Wayne Carroll, Virendra S. Negi, Arthur Peters and Richard P. Brown, having U.S. Pat. No. 4,322,846 and issued on Mar. 30, 1982.

8. "Local Bus Interface for Controlling Information Transfer Between Units in a Central Subsystem" by Arthur Peters, Virendra S. Negi, David E. Cushing, Richard P. Brown and Thomas F. Joyce, having U.S. Pat. No. 4,323,967 and issued on Apr. 6, 1982.

9. "Stack Mechanism with the Ability to Dynamically Alter the Size of a Stack in a Data Processing System" by Philip E. Stanley and P. Szorc, having U.S. Ser. No. 140,624 and filed on Apr. 15, 1980 which was abandoned and a continuation filed, having Ser. No. 430,488 and filed on Sept. 30, 1982.

10. "Interface for Controlling Information Transfers Between Main Data Processing Units and a Central Subsystem" by George J. Barlow, Philip E. Stanley and Richard P. Brown, having U.S. Pat. No. 4,371,928 and issued on Feb. 1, 1983.

BACKGROUND OF THE INVENTION

1. Field of the Invention

The invention relates generally to data processing systems and more particularly to the apparatus which receives data type field signals from a descriptor word of an instruction.

2. Description of the Prior Art

Within the data processing industry, there has been continual effort directed to increasing the performance of a computer system while at the same time decreasing the cost of the system. Among the many variables to be considered in an attempt to increase the performance of the data processing system, two very important considerations are the speed of the processor employed within the system and the speed with which data can be transferred between the system memory and the processor unit. One prior art approach to increasing the performance of the data processing system was to provide a plurality of processor units each connected to the system memory over a common data bus. As an extension of this approach, individual processor units were specially designed to execute particular types of processor operations. Thus, the data processing system might include a high speed, scientific processor unit specially adapted to performing complex mathematical calculations at a high level efficiency, a commercial instruction processor specially designed to officially perform operations common in business-related data processing, and a more generalized central processor unit serving as a master processor for controlling the operation of the entire data processing system while also providing additional processing capability.

It was common in such multiple processing data processing systems for each processor to communicate with the system memory by means of individual connections to a common data bus which in turn was connected to the system's memory. The great increase in processing power provided by the use of multiple specially designed processors resulted in a degree of success in increasing the overall performance of the system but the tremendous amount of data constantly being requested by the processors exceeded the capacity of the system's memory to transfer the data to the processors in order to have them executing at optimal rates.

A second approach to maximizing the performance of a computer system was to minimize the number of times a processor unit was required to access the system memory in order to obtain data stored therein. This approach contemplated the use of a very high speed memory limited capacity called a cache memory. The most recent information requested by the central processor unit from the system's memory would be stored in the cache memory simultaneously with its transfer to the processor unit. Subsequent requests for such information would result in the transfer of the data directly from the cache to the processing unit without any need for accessing the large capacity but slower system memory.

A third approach to increasing the performance of a data processing system was in fact a hybrid of the first and second approaches and contemplated providing multiple specialized processors within the data processor system and employing the cache memory for the controlling processor, e.g., the CPU. This ameliorated to a degree the lack of capacity to transfer sufficient data to the processors to enable them to operate efficiently. The CPU was, however, primarily benefitted because it was directly connected to the cache memory and it was required to access the system memory less often. A secondary benefit was provided to the other processors because a decrease in traffic on the data bus transferring information between the system memory and the processors resulted from the fewer requests for access by the CPU.

Even the hybrid approach, however, has not resulted in a data processing system wherein multiple specialized processors can be continually optimally operated. A significant impediment to maximizing the processor capabilities of the data processing system still arises from the inability to transfer information within the system at sufficiently high rates in order to take advantage of the inherent efficiencies of multiple, specially designed processors.

Another limitation to the performance of the system is the size of the operand that the CPU can process during a single machine cycle. CPU's such as described in U.S. Pat. No. 4,206,503 are limited to a 16-bit word.

OBJECTS OF THE INVENTION

Accordingly, it is an object of the present invention to further increase the performance of a data processing system.

It is a further object of the present invention to provide an improved CPU for processing operands of greater size.

It is another object of the present invention to provide an instruction type which includes a descriptor for specifying the size of the operand.

It is yet another object of the present invention to provide a means responsive to operand size signals and control store signals to cause the control store to branch to microprogram routines for processing the different operand sizes.

SUMMARY OF THE INVENTION

A data processing system includes a memory subsystem which stores instructions and operands and a central processor unit (CPU) which receives the instructions and operands from the memory subsystem and executes the instructions. The instructions include a first and a second word. The first word includes an operation code field and an escape code field. The operation code field identifies the instruction the CPU will execute and the escape code identifies the class of instruction including extended integer instructions (EII) and commercial instruction processor (CIP) instructions.

The second word includes a data type field and an address syllable field. The data type field identifies the type of operand. For the EII, the data field indicates a bit string, a digit, a half word, a word, a double word, a quad word or an address operand. For the CIP instruction, the data field indicates a digit or a half word operand. The address syllable in conjunction with the escape code indicates the elements involved in the calculation performed by the CPU to generate the effective address of the operand.

The CPU is microprogram (firmware) controlled and includes a control store for storing the microwords. The control store is responsive to the operation code signals for generating control signals representative of the microwords to control the CPU operation in executing the instruction.

During the execution of the instruction under firmware control, the data field signals are loaded into the F' register 76 of FIG. 11 and are applied to the address terminals of read only memories (ROM) 44-2. Also applied to the address terminals are a number of other signals. Bit position 4, the high order bit of the operation code, generates an FREG00+ signal which identifies the instruction as either an EII or a CIP instruction. A MEMADR— signal generated by the control store signals indicates if the operand is stored in the memory subsystem. If the MEMADR— signal indicates that the operand is stored in a register, then signal MISC7B+ generated by the control store signals identifies the register either as one of those addressable via address syllable 1 or one of those addressable via address syllable 3.

The ROM output signals ODSIZ1+, ODSIZ2+, ODSIZ4+ and ODADDR+ are tested by the firmware, resulting in the firmware branching to the routine which processes the indicated data type.

The address syllable may call for a third instruction word which represents an operand (IMO) or an address which is used to locate the operand (IMA).

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 1 is a general block diagram of the system in which the apparatus of the present invention is included;

FIG. 2 is a detailed block diagram of the central processing unit of the present invention;

FIG. 3 illustrates details of the connections to the arithmetic logic unit of the central processing unit of the present invention;

FIG. 4 illustrates details of the composition of locations of the control store included in the central processing unit of the present invention;

FIG. 6 identifies the data type bits of the descriptor word;

FIG. 7 shows the layout of the address syllable 1 map;

FIG. 8 shows the layout of the address syllable 2 map;

FIG. 9 shows the layout of the address syllable 3 map;

FIG. 10 shows a table of representative extended integer instructions;

FIG. 12 shows the bit configuration of the read only memory;

DESCRIPTION OF THE PREFERRED EMBODIMENT

Figure 5:
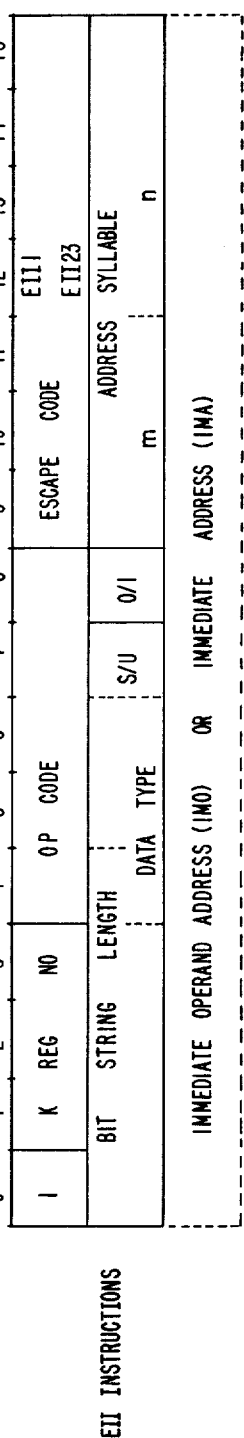
FIG. 5 identifies the instruction word and descriptor word fields.

FIG. 1 is a general block diagram of the configuration of the system in which the CPU to be described may be included. Such a system includes a central processor unit (CPU) 100, and optional processors which may include a scientific instruction processor (SIP) 101 and a commercial instruction processor (CIP) 102. These optional processors may be used to extend the range of the basic processor 100 for special applications. The system may also include a Cache/MMU (Cache memory/memory management unit) unit 103, an electrical system bus 105, memory modules (main memory) 106, input/output (I/O) controllers 107 coupled to I/O devices 108, and a multiline communications controller or processor (MLCP) 109. The system may also include a multiprocessor configuration in which there is a second central subsystem 110 which includes all or a portion of the above-described system.

The central subsystem processors are connected to each other by way of a local bus 9 and they are connected to the rest of the system by way of the Cache/MMU unit 103. The function of the Cache/MMU unit in the central subsystem is to provide a buffer storage for the portion of main memory 106 that is currently being used by the processors, and to provide for translation of the main memory address. The function of the local bus 9 is to provide an interconnection among the three processors and the Cache/MMU unit 103. As shown in FIG. 1, there are private interfaces between the CPU 100 and the other two processors. There is also a private interface from each processor to the Cache/MMU. The local bus 9 is a time-shared or public interface, that is, shared by all three processors and the Cache/MMU. In addition, the Cache/MMU 103 provides an interface via the system bus 105 to the rest of the system, primarily the memory 106 and the I/O devices 108 via controllers 107.

The CPU block diagram of FIG. 2 will now be discussed. More particularly, the various electrical buses and functional units and their interrelationships will be discussed. The primary elements of the CPU are shown within the dotted lines. A first such element is the local bus interface 10 which includes a data buffer 31, a round robin procedure storage buffer 36, and various procedure/data word and address multiplexers (MUX's) coupled with a source bus 33 as well as other devices to be discussed. The first element 10 is utilized for the purpose of receiving data from the system bus 105.

A second element 16 is the arithmetic element and includes several devices including two sets of register arrays (RAM's) called the DRAM 11 and the BRAM 12, and the RAM or R bus 13, to which RAM's 11 and 12 are connected. It also includes the input or inner bus (IBUS) 14 to which the BRAM 12, as well as other devices, connects. The second element also includes the DALU 15, i.e., the arithmetic logic unit, which is coupled to drive the DRAM 11.

A third element 22 of the CPU includes the Outer (O) bus 17 and the Write (W) bus 84, the shifters 19-1 and 19-2 which connect them, and the selectors which drive them. These selectors include the DALU/R bus selector 20 and the Y register/P register (YP) selector 21.

A fourth primary element 27 is the address section of the CPU and includes the procedure address register (P) 23 and the data address register (Y) 24. It also includes the address multiplexer 25 and the Prefetch address register 26. Also included in element 27 are the write data register (W) 28, and the write data selector (WS) 29. This portion of the CPU is utilized for the purpose of transferring data to the local bus 9.

Device 30 is the test logic of the CPU, which is shown in FIG. 7, and includes a set of eight-to-one multiplexers which in turn drive a second set of at least two eight-to-one multiplexers which generate a single binary signal called "Test True" or "Test False", which is then used to control branching in the firmware. The Test True and False signals are coupled to the PROM's included in the control store banks 80 and 81 as shown in FIG. 5.

The next address generator 44 (FIG. 2) is coupled to the F register 38 and the F bus 37. The next address generator is primarily concerned with generating addresses for use in the CPU.

The function of element 10, which is the local bus data input area, is to receive data which is returning from the Cache/MMU 13 or from other devices on the local bus 9, to select data from the bootstrap PROM's 41 if a bootstrap procedure execution is requested, and to direct such data to the appropriate data buffer. If an instructional fetch is called for, for example, the data is placed in the function register. More particularly, the primary data buffer 31 receives 16 or 32-bit data words from the local bus 9. The output of the data buffer 31 is connected the the L bus 32. The L bus is used both to drive the source bus 33 by use of a pair of selectors DA 34 and DW 35 and to drive the four word procedure buffer 36. Non-procedural data enters the CPU via the source bus 33 which is driven from the data selectors from the L bus 32.

Procedural data enters the CPU via a different set of selectors, PA 39 and PW 40, coming from the procedure buffer 36. The procedure buffer has the responsibility of containing the next two or three words of the procedure to be executed, so that when they are required, time will not have to be spent fetching them. It is automatically reloaded from the Cache/MMU 103 via the local bus 9 as it is emptied by the CPU.

The F bus 37 is a special bus which is used for gating information for the F register 38, i.e., the four areas labeled FOP, FM, FN and Link. The F register is the primary instruction register of the CPU. The function of the F bus 37 is to take data from the F register 38 and provide data to the F register from various sources. There is also a multiplexer 43 which allows the loading of either constants or data from element AS' 42 into either the Link or the FN location of the F register 38.

Also in the element 10, which is the data input area, the set of bootstrap PROM's 41 can be used to provide instructions, in place of instructions from memory, if operating in the bootstrap mode.

The storage device (procedure store) 36 having locations A, B, C, and D is a round robin four-word procedure store. Whenever it has room for two words of procedure, i.e., it is at least half empty, then it automatically initiates a memory read of procedure via the local bus 9, from the Cache/MMU. The returning data is dropped into the next two locations which are available in this round robin store. As the CPU uses procedures by either emitting it to the source bus 33 for use inside the processing elements of the CPU, or by sending it to the F register 38 because it is part of an instruction, then the two pointers 36-1 and 36-2, which represent in effect cursors in the round robin store, advance to the next location available by use of a conductor included in device 36 which succesively enables the four locations to the outputs of device 36. The left-hand cursor or pointer 36-2 indicates the next word of procedure to be fetched; the right-hand cursor 36-1 represents the word following that. Sometimes one word of procedure is used up in which case the word indicated by the left-hand cursor would be used to generate the information, passing through the PW multiplexer 40. Sometimes there is a requirement for two words of procedure (as when pulling a large address form (LAF) address); then the words indicated by both the left-hand and the right-hand cursors are combined in the PA multiplexer 39 of the procedure selector.

Thus, element 10 is the area concerned with bringing data into the CPU through the source bus 33, via either data selectors 34 and 35, or the procedure selectors 39 and 40, or bringing data directly into the instruction (F)

register 38 via the procedure buffer (round robin procedure store) 36 and the F bus 37. Device (F') 76 is used to hold selected bits from auxiliary address information or syllables. The address syllable is actually part of a 16-bit data descriptor. Certain bits in the descriptor have to be retained for subsequent analysis. The operand-size bit in the CIP descriptor and the operand size and signed versus unsigned bits in the K register descriptor have to be retained. These are retained in the 5-bit F' register 76.

The second element 16 contains the arithmetic logic unit (DALU) 15, the BRAM 12 and the DRAM 11, containing all of the programmer visible registers, plus a number of non-programmer visible work registers. These data storage elements are organized as follows. The DRAM 11, which is one of the two sources which can drive the RAM bus 13, contains 32 locations, each of which is 24 bits wide. These locations are used to hold 7 so-called D registers, 2 halves (K & L) of the 7 so-called K registers which are 32 bits long, a number of internal pointers, and 7 so-called M registers. The BRAM 12 which contains 16 words, each 24 bits wide, contains the 7 base registers plus a number of programmer visible and programmer invisible pointers of various types.

FIG. 3 shows in more detail the relationship between the RAM's, the buses and the DALU 15. The DRAM 11 and the BRAM 12 can each be sources to the RAM bus 13. The BRAM 12 is actually a dual structure; that is, there are two parallel BRAM's 60 and 61 in the CPU. The two elements of the BRAM 12 are loaded identically. One such element which drives (or transfers data to) the R bus 13 is element 60, and the other which drives the I bus 14 is the BRAM element 61. The important aspect of the two identical BRAM's is that the system speed is increased.

The R bus 13 can be driven either by the BRAM 60 or by the DRAM 11. Other sources as will be seen also drive the I bus 14. The DALU 15 uses the I bus and the R bus as its inputs and the output of the DALU is then recycled to the DRAM and/or used elsewhere in the CPU.

Element 16 includes two buses of major interest. The so-called I bus 14 is the primary source of original input within the processor; that is, data from memory comes into this bus as does the output of the Q register 50 via driver 54 and the output of the BRAM 12. The second bus, the so-called R or RAM bus, is the point at which the outputs of the two different RAM's, the BRAM 12 and the DRAM 11, are coupled. The outputs of these two buses are the inputs to the DALU 15, which generates data which can either be returned into the DRAM 11 or sent to the O bus 17 for further processing in the system.

Both the I bus and the RAM bus employ a hardware element referred to as "batlatch" (BL) which is a gate whose input and output are tied together for coupling signals onto the bus. This batlatch is intended to take over control of that signal after the driving source is required to go off the bus for timing and sequencing reasons. When this happens, the batlatch then supports that signal at the same level as it was when the driving sources were present, until the batlatch is turned off at which time the bus signal can relax (go to a predetermined level such as zero volts).

The RAM bus 13 is the interface for the transfer of data between the control panel 90 and the central processing unit, and is connected to it via 16 bidirectional signal lines. Memory data couples to the I bus 14 via a set of drivers called the data latches (DL) 51. The data latches are paralleled by a second series of latches called SE or sign extension latches 52. These SE latches are used either to sign or zero extend the data latches when they are only providing a 16-bit quantity to the 24-bit bus. Similarly, the SE logic 52 is used to take either 7 or 8 bits of the current instruction and sign extend it to 24 bits for use by the branch and value instructions which get their displacement and their operand respectively from the right-hand portion of the instruction word.

There is also associated with the BRAM 12 and DRAM 11 logic called the select/modify logic 53, which allows the DRAM and the BRAM to be addressed in blocks of 8 registers, using various fields in the instructions to control the individual register selection within that block.

Constants generator (KON) 70 is also included in element 16, the primary ALU area, and is another source to the I bus 14; that is, it is the source that can be used to generate 24-bit constants onto the I bus for use by the arithmetic logic unit under control of the firmware.

Thus, element 16 is the primary arithmetic operation area in the CPU; that is, it is concerned with operand manipulation and with the generation of operands for insertion into the DRAM 11, or operands which are intended to be sent to the O bus 17, either to be returned to the BRAM 12 or to be sent to various address and data registers for output to the local bus 9.

Element 22 is concerned primarily with the section of the CPU referred to as the Outer (O) bus 17 and the Write (W) bus 84. The O bus 17 is the bus upon which various data paths are collected, i.e., the Y register 24, the P register 23, the output of the DALU 15 and the RAM bus 13. The W bus 84 is the bus which is used to transfer operands to the BRAM 12, to the write data registers, and to the BALU 55 which is the ALU primarily responsible for address manipulation.

Between the O bus 17 and the W bus 84 is a set of 24 multiplexing shifters 19 which allow the shifts of 1, 2 or 4 bits in either direction on O bus 17 operands. In addition, there is also a set of 16 multiplexing shifters 56 which are used to load operands into the Q register 50.

Two of the four different types of operands which are sourced to the O bus 17 originate at the DALU 15 and at the RAM bus 13 and are selected through a two-to-one multiplexer 20 coupled to the O bus 17. Two other sources for the O bus 17 are the Y register 24 which is the data address register, and the procedure address (P) register 23. The outputs of these two units are coupled via the two-to-one multiplexer (Y/P selector) 21 and sourced onto the O bus 17. Also coupled to the O bus 17 is the I register 57, the indicator, register for the central processing subsystem. The contents of the O bus 17 can be transferred either directly or shifted to the W bus 84 for further processing in the CPU. They can also be loaded into the Q register 50 directly so that the Q register can be used for double precision shift operations.

All shifting which takes place within the CPU takes place by manipulation of operands between the O bus 17 and the W bus 84. The twenty-four shifters 19 are used to shift 24-bit operands, the size of the operands on the O bus 17 and the W bus 84, left or right under the control of the control store word. They can shift by either 1, 2 or 4-bit positions, transfer the operand straight through, or transfer the operand through with the two right-hand bytes of the operand interchanged. The operation of these shifters is controlled by a special field in the control store word. This section of the CPU is used for 24-bit operands shifts. When 32-bit (double register) operands are shifted, the right-hand operand is loaded into the Q register 50 via the O bus 17, and then a shift is performed in which not only the W bus shifter 19, but also the sixteen Q register shifters 56 are operated. The Q register contents are thereby treated as a 16-bit extension on the right-hand end of the 24-bit operand which is being shifted onto the W bus 84; the ends of these two shifters are coupled together, thus allowing a 40-bit shift to occur. In such double register shifts, the operands of interest are the 16 bits which are returned to the Q register 50 and the 16 bits which are transferred to the right-hand two bytes of the O bus 17 while the left-hand 8 bits of the data of the W bus 84 are usually discarded.

Element 75 represents the collection of the status bits in the CPU for emission to the W bus 84 via driver 93 under certain conditions. The W bus 84 has two sources, the primary one being the shifter 19 from the O bus 17. This shifter 19 can be disabled as an input to bus 88 and instead the status bits (S/Z) in element 75 can be placed on the W bus 84 for subsequent analysis by the firmware.

One unit of hardware which is associated with the Q register 50 which has not been previously discussed is the XB register 58 and the decoder 59 coupled thereto. The XB register 58 is used during index shifting to capture those bits of the index which are shifted right for subword operands and which are lost because they move to the right of the single word bit in the address. They are captured in the XB register 58, one bit for half-word bits, two bits for digit shifts, and four bits for bit-sized operand shifts. The XB register 58 contents are subsequently used to directly control left versus right-half selection when dealing with half-word operands, when generating a parameter to be sent to the commercial instruction processor for digit operands, and to generate a mask of 15 binary ZERO's and a single binary ONE, in conjunction with the decoder 59, when operating on bit operands. That is, for a bit operand, a word is read, a mask is used to set or clear the selected bit in the word, and then the word is written back into the memory. The mask is generated from decoder 59 and is an input to the Q register 50. That is, one of the items that can be loaded into the Q register is the decoder mask generated from the contents of the XB register 58.

The fourth major element in the CPU is area 27, the element which is concerned with the generation of addresses, commands and operands for transmittal to the local bus 9, and via the local bus to either the CIP 102, the SIP 101, or the Cache/MMU 103 and hence, to memory or to Input/Output (I/O) devices 108. This major element can be broken down into approximately three areas, the first being the write data register (W) 28 and the write selector (WS) 29. Register 28 is a 32-bit register with a partitioned load capability, that is, either the right half or the left half, or both halves of this register can be loaded. The right half is always loaded from 16 bits of the W bus 84 via drivers 74. The left half is written with data which comes from the write selector 29. This write selector has as its 16 inputs either the 16 bits of the right half of the W bus 84 or the 8 left-hand bits of the W bus plus either sign or zero extension. The W bus is the primary path by which data can be sent to the W register 28 in order to subsequently write such data to any other device coupled on the local bus 9.

The next area in the local bus output interface 27 is the command driver 71. The command driver 71 drives a series of command lines which accompany all transfers by the CPU 100 on the local bus and indicates to the Cache/MMU 103 either a memory reference cycle, an I/O reference cycle, or a local bus reference cycle to the Cache/MMU or one of the local bus processing units. The information which is transferred onto the command lines is derived from the F and FK fields of the control store or firmware (FW) word shown in FIG. 4, which also at other times the functioning of the F register 38 of element 10.

The third portion of element 27 includes the two primary address registers, i.e., the Y register 24 for non-procedural memory addresses and for addresses to other devices on the local and system buses, and the P register 23 (the program counter), and the prefetch register 26.

The P register 23 keeps track of the last word which the firmware has used, which word has been taken from the round robin buffer 36 and input to the CPU 100 for operations thereon. The prefetch register 26 keeps track of which word is to be next fetched from memory; that is, the P and PF registers may differ by any number in memory address from one to four words, depending on how full the round robin buffer is and how recently the central processing system has taken data from the buffer. If the central processing system has taken all the data from the buffer, it takes a finite amount of time for the Cache/MMU 103 to respond with new data in response to a request, and fill buffer 36 again. Under those circumstances, the prefetch register 26 and the address of the P counter or register 23 would be close together or the same in address content. When the buffer 36 is full and the CPU 100 has not taken any data recently, then the P register will be two to four words behind the prefetch register because it is indicating the last word taken from the prefetch register which indicates the next word to be sent forth from memory as soon as there is room for it in the prefetch register.

The contents of the P register 23 are never admitted to the local bus 9 as a memory address source. The two sources for data which can go to the local bus via the virtual address multiplexer 25 are the Y register 24 which is used for all non-procedural fetches and the prefetch register 26 which is used automatically by the prefetch logic to go to memory and request words for use in subsequent firmware steps.

The arrows on devices 23, 24 and 26 are indicative of the incrementing capability of those particular registers. That is, the P register can increment by either one or two words depending on the number of words which are taken out of the prefetch buffer 36 at a time. That is, pulling one word from the prefetch 36 buffer automatically increments the P register by one; pulling two words from the prefetch buffer 36 automatically increments the P register by two. The prefetch register 26 always increments by two because prefetches are always performed on a pair of words. The Y register can increment by either one or two under the control of the firmware as it is used, or in preparation for future use. There is a bus control field in the firmware word which allows control of such incrementing and the various cycle requests to the local bus.

The inputs to the W register 28 are two 16-bit data paths which are exercised in various ways. If it is desired to write a 24-bit address, then the drivers 74 are turned on enabling the right-hand 16 bits of the W bus to be transferred to the right-hand 16 bits of the W register. The multiplexer 29 is conditioned such that the left-hand 8 bits of the W bus and the 8 binary ZERO's are emitted to the left-hand half of the W register 28. This loads a two-word, 24-bit address into the W register for subsequently writing into memory. If it is desired to write a single word into memory, then the right half of the W register is not clocked (i.e., enabled) and does not change; the multiplexer 29 is conditioned to enable the 16 right-hand bits of the W bus to the 16 left-hand bits of the W register where they are clocked in. For single word writes the left half of the W register is the data that is written into memory.

The logic heretofore described is used to request and accept data from other entities on the local bus 9 such as the Cache/MMU 107, the CIP 102 or the SIP 101, to operate on it and store it internally in various registers via the two ALU's which are contained in the system, and to create new operands which are subsequently modified and sent out to the local bus to one of the entities thereon with an address of which entity (computed internally in the CPU and used to control the local bus). All of these operations are performed under the control of control firmware which is stored in a 2,048-word by 96 bits-per-word control store 80 and 81 which is included in the CPU.

The control store is partitioned into a number of individual fields, each of which controls some aspect of the internal performance of the CPU. FIG. 4 illustrates the firmware word and the various fields of interest therein. The first of these fields is the local bus (LB) field, bits 0 through 7 of the control store. The LB field is concerned with the requesting of various cycles from the local bus 9 and the responses thereto. It is also responsible for the emission of virtual addresses via the prefetch register 26 or the Y register 24, and it controls the various incrementing of the Y and P registers. The local bus field also controls the successive reading of data from the round robin procedure buffer 36 and the enabling of the data and procedure multiplexers 34, 35, 39 and 40 respectively onto the source bus 33 for subsequent use by the I bus 14.

The next field, the clock (CK) field, bits 8 and 9 of the control store, is used to control the CPU clock speed, i.e., the interval between successive clock pulses in the CPU. Each firmware step has assigned to it the clock speed which is appropriate to its complexity. In the system of the present invention, there are four possible intervals between successive clock pulses: 96 nanoseconds, 105 nanoseconds, 130 nanoseconds or 170 nanoseconds. Which of these is used for a firmware step is controlled by the CK field for that firmware step.

The next field is the TC field, bits 10 through 15 in the control store. This is a 6-bit field and selects one of 64 possible logic functions within the CPU for testing and control of firmware sequences.

The next field is the BR field, bits 17 through 19, and is used to control the type of action which is taken as a result of a test condition; that is, what type of branch occurred, whether the branch simply selects between two firmware steps or whether it selects between a firmware step and a so-called control store splatter (the generation of one of a multiplicity of control store next addresses based on the state of one or more logic elements in the CPU in which the next address is controlled by some function of the F register 38 contents).

The next field of interest, the TP field, bit 21, is the Test Polarity field. It controls whether the test condition is tested to determine whether it is true or false.

The NA field, bits 22 through 31, is a 10-bit field which is used to generate at least one of the two addresses which are selected by all branches. The other address is either derived also from the same NA field or from the control store splatters previously mentioned.

The next field, bits 32 through 39, is the F register control field, partitioned into a 4-bit part called F and a second 4-bit part called FK. The F and FK fields are used to control the loading and strobing of various elements in the F register and in the area of the F bus; that is, it is used to control the strobing of F' and AS' devices, the subparts of the F register 38 and the multiplexer 43. Which of these devices are loaded and what sources they have for their loading are all controlled by the F and FK fields.

The next field, bits 40 through 47, is the K (i.e., constant) field and is used to drive the I bus 14. It is an 8-bit field which provides the right-hand 8 bits for all constants which are admitted to the I bus. The left-hand 16 bits of the constant are controlled by the I bus field which will be discussed hereinafter. The K field is directly related to the KON device 70.

The next fields in the control store, bits 48 through 63, are concerned primarily with the addressing and control of the DRAM 11 and the BRAM 12. The 2-bit field, DW, is used to control writing into the DRAM with 1 bit controlling write operations into the leftmost (the most significant) 8 bits of the DRAM, and the other bit controlling write operations into the second rightmost (the least significant) 16 bits. The next bit, bit 50 (field BW), is used to control write operations into both parts of the BRAM, which are always written into together. The next field, DS, is 5 bits in length and provides the selection of 1 of 32 registers in the DRAM 11. The DM field, bits 56 and 57, is the select/modify field associated with the DRAM and allows the selection of either the DRAM directly or any of three different functions of the F register 38 for qualifying the addressing of the DRAM.

The next field of interest is the B select field (BS), bits 60 through 63, which is used for the selection of 1 of the 16 registers in the BRAM. The 2-bit field comprising bits 58 and 59 is the select/modify field (BM) for BRAM addressing. It performs similarly to that for the BRAM addressing except that it is separate so that independent select and modify functions can be specified for both the BRAM and DRAM.

The next field of interest is the GP field which is 7 bits in length (bits 65 through 71) and is used to control a large number of general purpose microoperations within the processor such as the clocking of various bistable flip-flops and the enabling of various control functions. It is also used to control access to the control panel 90 from the CPU, to input and output data to the control panel, and to control various flip-flops therein.

The next field, the RB field, bits 72 and 73, is used to control the sourcing of data onto the R bus 13 with 1 bit controlling the BRAM and the other bit controlling the DRAM.

The BA field, bits 74 through 79, is used to control the functions of the BALU 55, the arithmetic logic unit which has as its inputs the I bus and the W bus and which can be used to drive the Y register 24. These 6 bits are used as follows: one as a carry inject to the BALU, one for logic/arithmetic control, and the other four to select particular functions.

The next field of interest is the IB field, bits 80 through 83, and is used to control which data source is enabled to the I bus 14. This field can enable the data latches, sign extend the F register or select a constant, or the BRAM, in various combinations to the I bus.

The next field, the SH field, bits 84 through 89, is used to control both the shifters and the W bus sourcing which was discussed earlier. The 6 bits enable the system to have a large amount of autonomous control over what registers are enabled to the W bus and whether or not the Q register loads and in what direction the shifters shift the operand as it passes through.

The final field, the DA field, bits 90 through 95, is the function control for the DALU 15 with 6 bits having analogous functions to those in the BA field, i.e., one bit is a carry inject, one bit selects logic versus arithmetic and the other four bits are to select particular functions.

The control store for the CPU is actually two control stores: an upper bank 80 and a lower bank 81. The upper bank is addressed by the next address generator 44 and the lower bank is addressed directly by a portion of the contents of the then-current control store word. In the case of the more common types of branches, both use the NA field of the control store word as the basic source of the next address, and modify it in some way so that the two addresses which go to the upper and lower banks are essentially identical. In the case of the other branches, those which select between a next address and a PROM generator splatter, the lower bank receives the next address field unchanged from the current control store word, while the upper bank receives the splatter address from the current control store word. The control store is partitioned in this way so that the system can be doing a simultaneous access of both possible next address control store words and can postpone the decision of which one is going to be used until almost the very end of the current control store step, just prior to clocking the data in the control register 82. The details of the control store shall be discussed hereinafter.

The manner in which the CPU and firmware interact to perform certain typical central processor operations such as (a) reading a word from memory, (b) computing a next address for reading another word from memory, (c) writing a word into memory and (d) performing some type of iterative algorithm in which the operations are entirely internal to the CPU will now be discussed. The situations given will be typical and representative operations will be described.

In the case of reading a word from memory during a control store step, the control store word will enable the virtual memory address of the word from the BRAM 12 onto the RAM bus 13 via the RB, BS and BM fields. The SH field will then condition the O bus and the W bus sourcing such that the RAM bus is enabled through the selector 20 to the O bus 17, and then unaltered through the shifter 19 onto the W bus 84. The W bus is an input to the BALU 55, which is conditioned by the BA field to enable its W bus input directly to its output. At the same time, the LB field will cause the Y register 24 to load, thus transferring the address into the Y register.

In the next firmware step, the LB field then causes a request to be directed to the local bus indicating that a memory request is required and that the address provided to the local bus should be used to make such a request. The command lines 71 are conditioned by the F and FK fields (shown as box 72 in FIG. 2) to indicate the memory read request is required. The address multiplexer 25 is conditioned to enable the contents of the Y register onto the local bus via the 24 address lines. The Cache/MMU memory which monitors and controls all activity on the local bus acknowledges the request, while the CPU proceeds to the next firmware step. In the next firmware step, the local bus field will then specify a stall, indicating that the CPU should not leave this firmware step until the end of the local bus cycle has been detected returning the data from the Cache/MMU via the local bus into the CPU data buffer. As soon as this return cycle is detected, the stall ends and the CPU will enter the fourth step of this read cycle.

The fourth step will be one in which the firmware will specify an LB field which uses the data that is in the data buffer and sources it onto the I bus for use by the CPU. The LB field will thus enable either the DA driver 34 or the DW driver 35, depending on whether a word, 16 bits in length, or an address, 24 bits in length, is required onto the source bus. In turn, the I bus field will specify that the source bus, either all 24 bits of it or 16 bits sign extended to 24, will be enabled onto the I bus. In the I bus, assuming that there is a 16-bit word that is being received back from the data buffer, the DA field would be used to enable the DALU to read the I bus and the DW, D select and DM fields would be controlled to address and write into one of the 32 registers in the DRAM. This would complete the fourth step of this control sequence, the first of which loaded the Y register, the second of which made the read request, the third of which waited for data to come back, and the fourth of which took the data and enabled it into one of the registers in the CPU.

A second typical sequence of operations which may be performed by the system is the manipulation of operands in an arithmetic operation such as adding an operand which has been fetched from memory to one of the data registers and, after the addition, returning to the data register and placing it into the write data buffer so that it can be subsequently written back into memory. This sequence of operations would begin following the stall referred to in the previous operation. The step would be one which enabled the data, which in the case of a word operand would be a word, from the data buffer 31 via the L bus and the data multiplexer 35 onto the source bus. Then, the I bus field would specify that the source bus, sign extended via the sign extension device 52, and the data latches 51 be enabled onto the I bus. At the same time, the R bus control field would specify that the particular data register of interest be enabled to the R bus 13 from the DRAM 11. The DA field, i.e., the DALU control field, would then specify that the DALU be conditioned to add the 24 bits on the R bus 13 to the 24 bits on the I bus 14. This logic 15 would have as its output 24 bits representing the sum. The DW bit would indicate that the output of the DALU was to be written back into the DRAM 11.

At the same time, the output of the DALU would be enabled to the W bus via the SH field. This field would indicate that the selector 20 would be enabled to the O bus and would be conditioned to select the DALU output instead of the R bus output for that purpose. Also at the same time, the shifter 19-1 would be conditioned to pass the O bus contents through without change to the W bus 84. The same LB field which specified DW 35 to the source bus 33 would also have specified that the W bus would be enabled to the left half of the W register 28 via the selector 29. This would all take place in a single firmware step. Since this is an add operation, presumably the overflow from the add would be tested by a test specified by the test logic 30. The next address logic would generate one address which would indicate a particular entry to go to if the operand is to be written back into memory immediately. The other address, which would be to the lower bank, would be generated to take the next step which would then set the overflow indicator in the I register 57. If there was no overflow, the I register would have been automatically cleared.

The third operation would consist of writing an operand into memory. This would take three firmware steps to perform. The first would be a step in which the address in which the operand is to be written is loaded into the Y register 24. The second step would be to put the operand to be written into the W register 28. The third step would be one in which the LB field would specify that a local bus request, specifying a memory write, be addressed to the local bus for the Cache/MMU to receive and execute.

The first step, that which loads the Y register 24, would get the address presumably from one of the 16 locations in the BRAM random access store. This would be performed by conditioning the I bus field so that the I bus would look at the output of the BRAM. The B select field would indicate which of the 16 BRAM registers was addressed for this purpose. The BALU 55, which is controlled by the BA field, would be conditioned to pass the contents (24 bits) of the I bus to its output. The LB field would be one which specified to load the Y register. Since input to the Y register is the output of the BALU, this would transfer the contents of the selected BRAM into the Y register. The next control store step would take the operand from its origin, wherever that might be, in this case, for example, one of the 32 DRAM locations. The DS field would select which of the 32 DRAM's would be enabled. The RB field would enable the DRAM onto the R bus. The SH field would select the RAM bus to the O bus 17 via selector 20, and the O bus to the W bus 84 via shifter 19 with no shifting taking place. The LB field would specify to load the W register, left half. This would be performed by conditioning the W selector 29 to enable the right two-thirds of the W bus to the left half of the W register, and the W register would be enabled to load its left half.

Finally, the third firmware step would be performed. In this firmware step, the only essential operation is that the local bus field, the LB field, should specify a local bus write to memory. This would use the F and FK bits as command lines going to the local bus to indicate to the Cache/MMU that this is a memory write operation. The address would be enabled to the local bus via the virtual address selector 25 from the Y register 24. The data would be enabled to the local bus from the W register 28. The Cache/MMU memory arbitrating all local bus transfers would recognize this as a memory write cycle and would take the address, map it, send it to memory accompanied by the data, and indicate on the system to the memory that this is a memory write operation.

The fourth sequence of a typical operation which the CPU could perform is that in which a double precision operand is shifted some number of bits to the left or right. Presuming that the operands are both in the BRAM, that is, the two operands of interest are in the BRAM, the first firmware step would initiate the transfer of the right-hand of these two operands to the Q register. This would proceed as follows. The BS field would be conditioned to address one of the 16 locations that contains this operand in the BRAM 12. The R bus field, controlling the RAM bus 13, would be conditioned to take the BRAM output instead of the DRAM output. The SH field would be conditioned to transfer the R bus to the O bus via the selector 20, by enabling it to the O bus and selecting its input from the R bus, and would also specify that the Q register and the W bus both receive the contents of the O bus and would clock the Q register to load it. This would cause the operand addressed in the BRAM to be transferred to the Q register.

The next step, or steps, would be those in which the shifts are actually performed. In this step, the other of the two registers containing the second operand in the BRAM is addressed by the B select field and the BRAM is enabled onto the RAM bus 13 via the RB field. The RAM bus would then be enabled to the O bus via the selector 20. The SH field would take any of a number of values depending on which direction and for how many bits the shift is to be performed. The SH field is capable of selecting a left or right shift of either 1, 2 or 4 bits. In any of these cases, the Q register 50 is considered to be connected as an extension of the O bus 17, creating a 32-bit operand. Actually, it is a 40-bit operand but the left-hand 8 bits of the O bus are ignored. This 32-bit operand is shifted either left or right as indicated by the particular SH field. The 16 right-hand bits are returned to the Q register 50 and the 16 left-hand bits, together with the 8 bits which were ignored, are transferred onto the W bus 84. This is controlled by the SH field which has exclusive control over the shift distance.

The operand having been shifted from the O bus 17 to the W bus 84 and from the Q register back to the Q register, the SH field causes the Q register to reload the shifted operand, while at the same time the BW field causes the W bus to be written into the addressed BRAM location. Thus, the contents of the B and Q registers have been shifted and returned back to the B and Q registers. The particular end effects associated with this shift, whether this is an open, circular or arithmetic shift, are a function of the control flip-flops in the CPU. This type of step in which the actual shifting is performed is performed some number of times in various combinations. That is, if it were desired to shift left by 5 bits, then a step which resulted in a shift left by 1 bit would be succeeded by a step which shifted left by 4 bits. To shift right by three would require a shift right by two and then by one, for example.

After the final shift has been performed, i.e., after the operands are now correctly aligned in the addressed BRAM location and the Q register, the final step does not cause a shift but instead returns the Q register contents back to the BRAM location from which it was originally loaded. This would be performed as follows. The I bus field would specify that the I bus is driven by the Q register (16 bits of Q extended by 8 bits of binary ZERO's). The DALU 15 would be controlled by the DA field so that it passed through the I bus unchanged. The SH field would be selected so that it enabled the DALU, unchanged via the selector 20, to the O bus 17, and again unchanged, via the shifter 19 to the W bus 84. The BW bit 50 in the firmware word would then be set to condition the loading of the BRAM from the W bus and the BS (B select) bits would be conditioned to specify which of the 16 locations in the BRAM were to receive the shifted operand. This would all take place in some number of firmware steps, for example, three or more. One step would be used to load the Q register creating a 40-bit operand, one or more to perform the shifting of that operand as required, and then one to return the Q register contents (the right-hand 16 bits) to the BRAM to complete the operation.

The CPU 100 is a microprogrammed 24-bit processor which receives instructions and 16-bit or 24-bit operands from the cache/MMU 103 and executes the instructions by manipulating the operands. This specification describes the apparatus which under microprogram control realigns the operands and memory addresses as they are transferred from the various sources via the R bus 13 and the O bus 17 to the W bus 84. The apparatus for the alignment of the operands and memory addresses is responsive to the SH shift field bits 84 through 89 of the 96-bit microword of FIG. 4.

Referring to FIG. 5, the extended integer instruction (EII) makes use of the 32-bit operand processing capability of the system. The EII is made up of two or three 16-bit words. A first word includes the operation code of the instruction, an escape code which indicates the instruction family, EII, and a field identifying the register containing the first (if dyodic) or only (if monodic) operand of the instruction.

A second word, called a descriptor word, describes the type of operand: bit string, digit, half word, word, double word, quad word or address, and whether the operand is signed or unsigned. The descriptor word also includes one of three address syllables, selected by the escape code, which locates the operand and also indicates if the instruction includes a third or third and fourth word.

The third word, if required, contains an operand called an immediate operand (IMO), or the third and fourth words contain the effective address of the operand called an immediate address (IMA).

The first word contains a binary ONE in bit position 1. Bit positions 1 through 3 identify the K register which contains the first operand. The 32-bit K registers K1 through K7 appear in 14 addressable locations of the DRAM 11, FIG. 2. Also, the K1, K2 and K3 registers are used as index registers during address preparation. Bit positions 4 through 8 identify the operation code of the instruction to be executed. Bit positions 9 through 15 store an escape code to identify this as an EII instruction and partially specify the address syllable this instruction will use. Escape codes of $6C_{16}$ and $7C_{16}$ together with bit position 8 of the second word identify the instruction as an EII instruction, and further specify which of the three possible address syllables pointing to the operand is in bit positions 9 through 15 of the second word.

The second 16-bit word of the EII instructions, the descriptor word, identifies the type of operand, the size of the operand and, as described supra, indicates the address syllable pointing to the operand in main memory 108 or in registers. Bit positions 0 through 7 identify the size and type of operand, and are organized in three subfields. Bit positions 4 through 7 identify the data type with bit position 7 at binary ONE indicating a signed operand and binary ZERO indicating an unsigned operand. Bit positions 0 through 4 indicate the number of bits in the operand if the operand is of the bit string type.

The address syllable, bit positions 9 through 15, locates the second operand by identifying registers storing the operands, pointing to the next word or words of procedure whose contents are the operand, or specifying some type of address function which results in a pointer to a word or words in main memory 108 which contain the operand. The address syllable has an M portion, bit positions 9 through 11, and an N portion, bit positions 12 through 15, which are discussed infra.

Referring to FIG. 6, the data bits 4 through 7 are referenced to the memory operand. Note that the data type codes 0010 and 0011, which are normally the codes for unsigned and signed digits, are illegal for EII operands. Also illegal are the unsigned double word (1010), the unsigned and signed quad word (110X), and the signed address (1111). Note that all of the operands are 32-bit operands; signed operands are sign extended to the left, and unsigned operands are zero extended to the left to fill out the 32-bit field.

The column entitled IMO shows that when the third word of the instruction contains an immediate operand, it is limited to an unsigned or signed word, a signed double word on an unsigned address.

The column entitled =Kn shows the operand types that may be transferred into one of the K1 through K7 registers, addressed via address syllable 3. They are limited to the signed double word and the unsigned address.

The column entitled REG shows the operand types that may be transferred into the B registers B0 through B7 of BRAM 12, FIG. 2, or into the R registers R1 through R7 from DRAM 11; namely the unsigned and signed word, the signed double word R register only and the unsigned address (B register only).

FIGS. 7, 8 and 9 show the maps of address syllables (AS) 1, 2 and 3 respectively. EII 1 execution code $6C_{16}$ specifies AS 1, EII 23 execution code $7C_{16}$ with bit position 8 of word 2 at logical ZERO specifies AS 2, and at logical ONE specifies AS 3. The coordinates of the maps are M and N, bit positions 9 through 11 and 12 through 15 respectively of the AS. The following table defines the elements of the maps of FIGS. 7, 8 and 9.

| | |
|---|---|
| D | D indicates a one word, 16-bit signed displacement (in words) that follows the address syllable, where $-2^{15} \leq D \leq 2_{15} - 1$. |
| Δ | Δ indicates a two word, 32-bit signed displacement in words that follows the address syllable, where $-2^{31} \leq \Delta \leq 2_{31} - 1$. |
| @ | Indirect operator. |
| +R | Specifies indexing, where $-2^{15} \leq R \leq +2_{15} - 1$. |
| +K | Specifies indexing, where $-2^{31} \leq K \leq 2^{31} - 1$. |
| FB | FT + L. |
| FT | Address of the top element of the current active frame in the stack. |
| L | Length in words of active stack frame. Auto increment (B↑, R↑ or FT↑ indicates post-incrementation). Auto decrement (↓B, ↓R or ↓FT indicates pre-decrementation). |
| IMA | Immediate address. |
| IA | Intermediate address. |
| B | Base register. |
| K | Double word operand register. |
| R | Word and half word operand register. |
| P | Program counter. For the purpose of P Relative addressing, the following definition is used: Pd: Points to the displacement to be added to Pd. (At the completion of an instruction, P points |

-continued

| | | |
|---|---|---|
| ( ) | Logical binding. | |
| [ ] | Contents of. | |
| + | Addition operation. | |
| IMO | Immediate operand. | |
| IV | Interrupt vector. | |
| O | Specifies an offset in bits. O is recognized only when executing subword instructions: For bit instructions, O specifies an offset in bits of $0 \leq O \leq 15$. For digit instructions, the high order 2 bits allow an offset of either 0, 4, 8 or 12 bits. For byte instructions, only the high order bit of the offset field is used. Thus, O is interpreted as an offset of either 0 or 8 bits. For all other instructions, O is ignored. | |
| − | Subtraction operation. | |
| × | Multiplication operation. | |
| ≤ | Is replaced by. | |
| EA | Effective address. | |

An address syllable 1 (AS 1), FIG. 7, coordinates (5,1) through (5,7) select REG. Where the EII data type is an address, the coordinates select registers B1 through B7 ((5,4) selects register B4). Where the EII data type is a double word, an AS 1 of (5,3), (5,5) or (5,7) selects two 16-bit registers R2/R3, R4/R5 or R6/R7 respectively.

AS 3, FIG. 9, coordinates (5,1) through (5,7) select REG. Where the EII data type is a double word or address, then coordinates (5,4) select register K4 for processing the double word or address.

AS 1 (7,0), FIG. 7, may select the IMO for word, double word or quad word data types. In EII instructions, the size of the IMO operand is determined by the bits in the data type field of word 2 of the instruction.

These forms specify an effective address (EA) of a memory location. MAS can have the following forms:

| |
|---|
| O P Relative |
| O Immediate address (IMA) |
| O B Relative |
| O IV Relative |
| O Stack Relative |

The following AS entries specify P Relative MAS forms:

| O From AS Map 1 (FIG. 7): | |
|---|---|
| P + D: | EA is formed by adding D to Pd. |
| @ [P + D]: | The EA is contained in the location pointed to by Pd + D. |
| O From AS Map 2 (FIG. 8): | |
| P + D + O: | EA is formed by first adding D to Pd, and then concatenating to this word address, the offset O.* |
| P + D + R(1 − 3) + O: | EA is formed by first adding D to Pd, then concatenating to this word address the offset O*, and lastly adding the atom index specified in R1 − 3. |
| @ [P + D] + O: | IA is a pointer read from the location defined by Pd + D. The offset O* is then concatenated to IA to obtain the EA. |
| P + Δ + O: | EA is formed by first adding Δ to Pd, and then concatenating to this word address, the offset O.* |

The following AS entries in AS Map 1 (FIG. 7) specify IMA MAS forms:

| | |
|---|---|
| IMA: | Immediate address. The EA is contained in the location(s) following the instruction. |
| @ IMA: | @ is the indirection operator. The EA is contained in the location(s) pointed to by IMA. |
| IMA + Rm: | The EA is IMA indexed by the scaled contents of Rm. |
| @ IMA + Rm: | The EA is obtained by adding the scaled contents of Rm to the contents of the location(s) pointed to by IMA (indirect post indexing). |

The following AS entries specify B Relative MAS forms:

| O From AS Map 1 (FIG. 7): | |
|---|---|
| Bn: | The EA is contained in register Bn. |
| @ B(n − 8): | The EA is contained in the memory location pointed to by B(n − 8). |
| Bn + Rm: | The EA is obtained by adding the scaled contents of the index register RM to the contents of Bn |
| @ B(n − 8) + Rm: | The EA is obtained by adding the scaled contents of the index register Rm to the contents of the location(s) pointed to by B(n − 8). |
| Bn + D: | The EA is formed by adding D to the contents of Bn. |
| @ [B(n − 8) + D]: | The EA is contained in the location(s) pointed to by B(n − 8) + D. |
| ↑ Bn: | The EA is contained in Bn after the contents of Bn is decremented by one. |
| Bn ↓: | The EA is contained in Bn. The contents of Bn is incremented by one. The incrementation takes place after EA formation and prior to execution of the opcode. |
| B(n − C) + R(m − 4) ↑: | The EA is obtained by adding the contents of B(n − C) with the scaled contents of index register R(m − 4). After EA formation and prior to execution of the opcode, the index register is incremented by one. |
| B(n − 8) + ↓ R(m − 4): | The contents of the index register R(m − 4) is decremented by one and then scaled and added to the contents of B(n − 8) to form the EA. |
| O From AS Map 2 (FIG. 8): | |
| Bn + D + O: | EA is formed by first adding D to Bn and then concatenating to this word address the offset O. |
| @ [B(n − 8) + D] + O: | IA is a pointer read from the location(s) defined by Bn(n − 8) + D. The offset O is then concatenated to IA to obtain the EA. |
| Bn + D + Rm + O: | EA is formed by first adding D to Bn, then concatenating to this word address the offset O, and lastly adding the atom index specified by Rm. |
| @ [B(n − 8) + D] + Rm + O: | IA is a pointer read from the location(s) defined by B(n − 8) + D. The offset O is then concatenated to IA, and lastly the atom index specified by Rm is added to obtain the EA. |
| O From AS Map 3 (FIG. 9): | |
| Bn + D + Km + O: | EA is formed by adding D to Bn, |

| | |
|---|---|
| | then concatenating to this word address the offset O*, and lastly adding the atom index specified by register Km. |

The following entry in AS Map 1 specifies the IV Relative MAS form:

| | |
|---|---|
| IV + D: | IA is the content of the location(s) defined by the Interrupt Vector for the current level. D is added to IA to obtain the EA. |

The following entries specify Stack Relative MAS forms:

| O From AS Map 1 (FIG. 7): | |
|---|---|
| ↑ FT ↓ : | The ↑ FT ↓ AS is opcode dependent. As a function of the opcode used, the active frame will either be pushed ( ↓ ), popped ( ↑ ), or a program error will result. The criteria for determining what operation applies are as follows: |
| | a. All store instructions imply PUSH. |
| | b. All read-write instructions and certain other instructions result in a branch to a trap routine, |
| | c. All other instructions imply POP. |

A PUSH ( ↓ ) operation implies that an operand is to be stored in the active frame. Consequently, the active frame must be enlarged accordingly. Following the enlargement of the frame, the new "acquired" space is used to store the operand.

Note that frame enlargement is in words. Consequently, if a byte is to be stored, then the frame is enlarged by one word, and the data is *left-justified* within the word. If an address is to be stored, then the frame is enlarged by two words.

A POP ( ↑ ) operation implies that the operand pointed to by FT is to be used as defined by the instruction and then subsequently removed from the frame.

Note that the frame size reduction is in words. Consequently, if the operand is a bit or a byte, the frame will be reduced in size by one word.

| O From AS Map 3 (FIG. 9): | |
|---|---|
| @ FT + O ↑ : | IA is a pointer read from the location(s) defined by FT. The offset O is concatenated to IA to form the EA. IA is then removed from the frame. |
| FT + D + Rn + O: | This AS is used to access data within the active frame. The word address IA is formed following the rules defined for the FT + D AS. The offset O is then concatenated to IA and lastly the atom index specified by Rn is added to obtain the EA. |
| @ [FT + D] + O: | IA is a pointer read from the location(s) defined by FT + D. (The same rules defined for the FT + D AS apply.) The offset O is concatenated to IA to form the EA. |
| @ [FT + D] + Rn + O: | IA is a pointer read from the location(s) defined by FT + D. (The same rules as defined for the FT + D AS apply.) The offset O is then concatenated to IA and |

| | |
|---|---|
| | lastly the atom index specified by Rn is added to obtain the EA. |

Referring to FIG. 7, the escape code (6,C) identifies an extended integer instruction (EII) and specifies that AS 1 is to be used. Escape code (7,C) identifies an EII and specifies that AS 2, FIG. 8, or AS 3, FIG. 9, is to be used. An escape code (5,C) identifies a CPU 100 instruction and specifies that AS 2 or AS 3 is to be used. AS 2 (M,0) or AS 3 (M,0) specifies a remote descriptor.

FIG. 10 shows a table of the single operand instructions (EII) which are described infra. They are increment, decrement, negate and complement. Also shown in FIG. 10 is a representative double operand instruction, swap. These instructions may set software visible indicators: overflow indicating that the operand extended beyond its boundary and carry indicating acarry resulted from the execution of the instruction.

Figure 11:
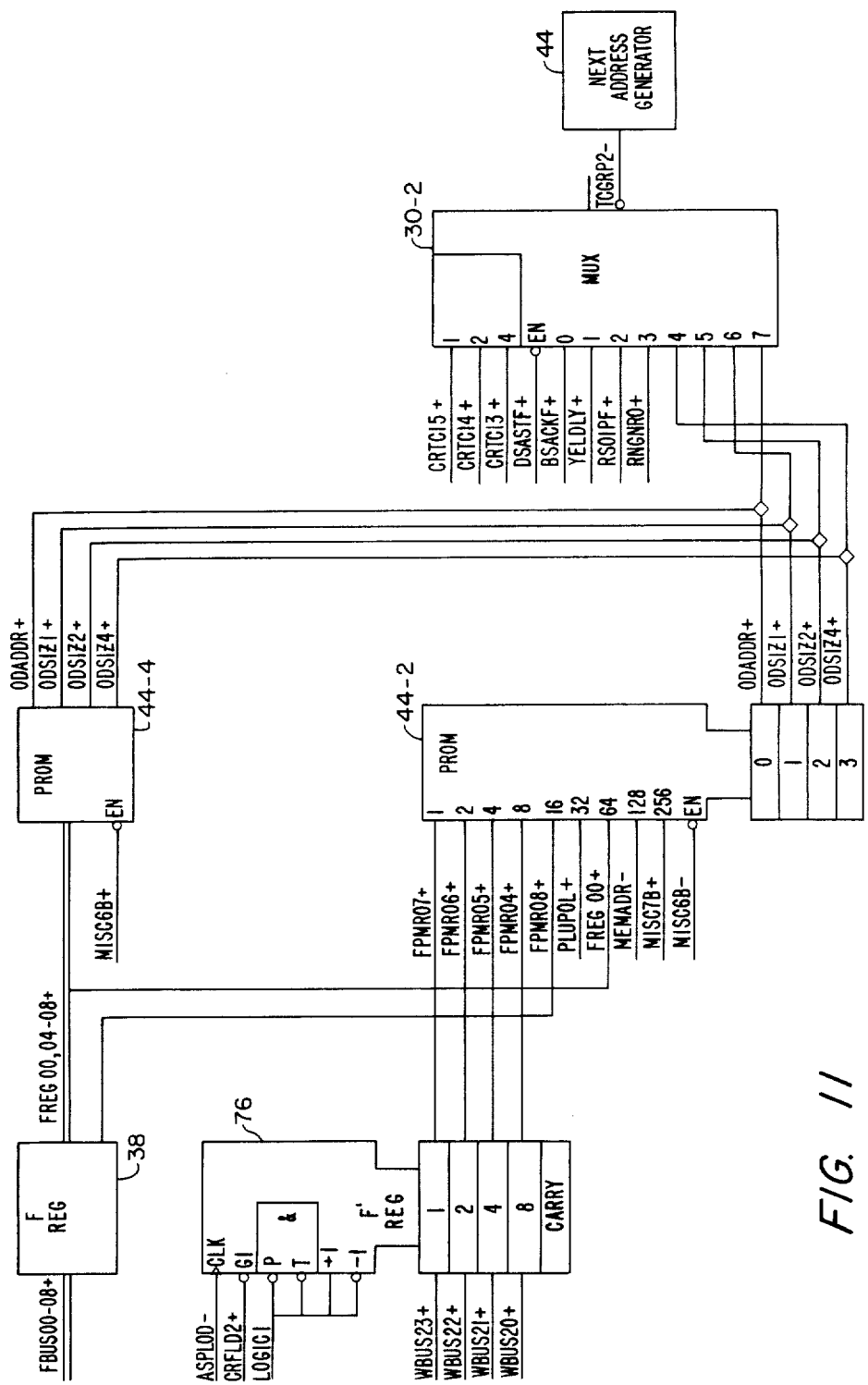
FIG. 11 is a logic diagram of the read only memory and associated logic.

Referring to FIG. 11, the operand type bits 4 through 7 are applied to a programmable read only memory (PROM) 44-2 which is in the next address generator 44 via signals FPMR 04+ through FPMR 07+, F' register 76 and W bus 84 signals WBUS 20+ through WBUS 23+. F' register 76 is enabled by signal CRFLD2+ and loaded on the rise of signal ASPLOD- from the F field, FIG. 4, of control store 80.

Signal FREG00+ applied to PROM 44-2 from F register 38 identifies the instruction as an EII when at logical ONE. Signal MISC7B+ identifies the address syllable as AS 1 or AS 2 when at logical ZERO and AS 3 when at logical ONE. During operand reference operations, the MEMADR— signal at logical ONE identifies the operand as being in a register, otherwise the operand is located in the memory subsystem. Signal FPRM08+ is immaterial for EII; it is only operative during CIP 102 instructions to identify digits or half words.

PROM 44-2 is enabled by signal MISC6B— at logical ZERO. At that time, signal MISC6B+ is at logical ONE thereby disabling PROM 44-4. Note that either PROM 44-2 or PROM 44-4 is operative. PROM 44-4 provides the data type signals for all instructions including CPU 100 instructions, but not including EII and CIP 102 instructions.

The F bus 37 signals FBUS 00-08+ are stored in the F register 38. The output signals FREG00, 04+ through 08+ are applied to the input address terminals of PROM 44-4. Also, signal FREG00+ is applied to the input address terminal 64 of PROM 44-2 to indicate an EII or a CIP instruction.

The data type signals ODADDR+, ODSIZ1+, ODSIZ2+ and ODSIZ4+ are applied to the input terminals 4 through 7 respectively of a MUX 30-2 of test logic 30, FIG. 2. The control store 80 signals CRTC15+, CRTC14+ and CRTC13+ from the TC field of FIG. 4 select the data type input signals when signal CRTC13+ is at logical ONE. MUX 30-2 is enabled by signal DSASTF+ at logical ZERO indicating normal machine operation. The output signal TCGRP2— is used by the next address generator 44.

FIG. 12 shows the contents of PROM 44-2. Column A, C, E or G is selected during CIP instructions (signal FREG00+ at logical ZERO), and column B, D, F or H is selected during EII (signal FREG00+ at logical ONE).

EII as determined by signal FREG00+ at logical ONE are independent of signal FPRM08+. Columns B and F provide signals representative of all operands, signal MEMADR— at logical ONE. When signal MEMADR— is at logical ZERO, column D provides signals representative of the word, double word and address operand, and column H provides signals representative of a double word when both the double word and address data type signals are applied to the input address terminals. All other input signal combinations result in an error condition. Column D is selected for AS 1 or AS 2, and column H is selected for AS 3. Note that the "D" output signal in columns B and F are reserved for future use.

Figure 13:
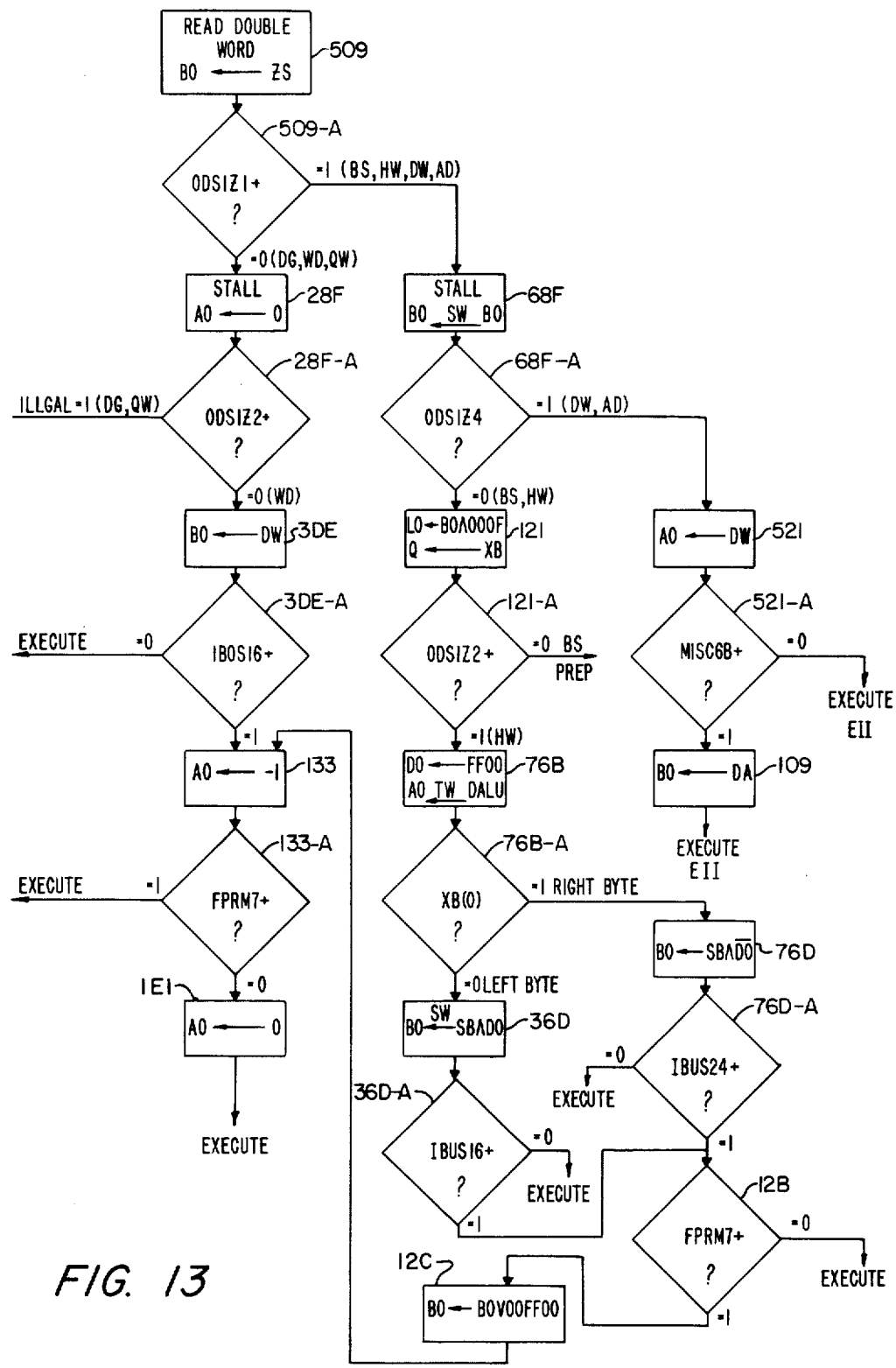
FIG. 13 is a flow diagram of the firmware which determines the operand size.

Referring to FIG. 13, the firmware examines the operation code bit positions 4 through 8 of the first word of the instruction, FIG. 5, and the escape code bit positions 9 through 15. If an EII, that is an escape code of $6C_{16}$ or $7C_{16}$, then the control store 80 branches to location 509 to begin the pre-processing of the instruction.

During the pre-processing, the operand is read from memory 106 or from specified registers, extended to 32 bits by extending the sign bit if the operand is signed, or forcing binary ZERO bits to fill out the field if the operand is unsigned. The operand is received from memory 106 as 2 double words of 16 bits each and stored in the 32-bit register DA 34. The low order 16 bits are transferred to 24-bit register B0 of BRAM 12 via L bus 32, drivers DW 35, S bus 33, I bus 14, DALU 15, selector 20, O bus 17, shifter 19 and W bus 84.

Block 509 initiates a double word read from memory and stores the index value stored into XB register 58 into the left portion of register B0. Included in block 509 is decision block 509-A which examines signal ODSIZ1+ from PROM 44-2. Signal ODSIZ1+ at logical ZERO indicates a digit, word or quad word operand, and at logical ONE indicates a bit string, half word, double word or address operand.

Block 28F forces the CPU 100 to stall while binary ZERO's are stored in 32-bit register A0 of BRAM 12. This presumes that the operand will be either unsigned or have a positive sign. Decision block 28F-A tests signal ODSIZ2+. Signal ODSIZ2+ at logical ONE indicates a digit or a quad word operand which is illegal and the firmware branches to a trap routine. Signal ODSIZ2+ at logical ZERO indicates a word operand and the firmware branches to block 3DE.

Block 3DE transfers the 16-bit word which was received from memory 106 and stored in register DB 31 to register B0 via L bus 32, DW 35, S bus 33, drivers DL 51, I bus 14, DALU 15, selector 20, O bus 17, shifter 19 and W bus 84. Decision block 3DE-A tests IBUS 16+, the sign bit, and if it is at logical ZERO, indicating a positive sign, then the firmware branches to start the execution routine. If IBUS 16+ indicates a negative sign, then the firmware branches to block 133.

Block 133 fills register A0 with binary ONE's preserving a negative operand. Decision block 133-A tests the F' register 76 signal FPRM07+ to determine if the operand was signed or unsigned. If FPRM07+ is at logical ONE indicating a signed operand, then the firmware branches to the execution routine. If signal FPRM07+ is at logical ZERO, then the firmware branches to block 1E1.

Block 1E1 fills register A0 with binary ZERO's to correct the extension bits and the firmware branches to execute the instruction.

If decision block 509-A indicated a bit string, half word, double word or address operand, then the firmware branches to block 68F.

Block 68F stalls the CPU 100 until the double word is received by register DB 31. The XB register 58 signals stored in the left portion of register B0 are swapped to the right portion of register B0 (bit positions 16 through 19 swapped to bit positions 24 through 27). Decision block 68F-A tests signal ODSIZ4+. Signal ODSIZ4+ at logical ONE indicates a double word or an address and at logical ZERO indicates a bit string or a half word.

Block 521 reads the left word of the double word or the address stored in register DB 31 through driver DW 35 into register A0. Decision block 521A signal MISC6B+ at logical ZERO indicates that this is not an EII instruction.

Block 109 reads the right word of the double word or the address stored in register DB 31 through driver DA 34 into register B0 and the firmware branches to an execution routine.

Block 121 loads the index value stored in the rightmost 4 bit positions into register L0 of DRAM 11 by using $000F_{16}$ to mask out bit positions 16 through 27 of register B0. Also, the index value is transferred from register XB to decoder 59, shifter 56, to register Q 50. Decoder 59 decodes the index value from the 4-bit code in register XB 58 to a 1 of 16 code for storage in register Q 50. Decision block 121-A tests signal ODSIZ2+ which indicates a bit string operand if at logical ZERO and a half word operand at logical ONE. The bit string operand firmware processing is not described further.

Block 76B stores $FF00_{16}$ in register D0 of DRAM 11 in preparation for masking the half word in register B0. The DALU 15 forces all binary ZERO's into register A0 by twinning $FF00_{16}$ through shifter 19 putting $0000_{16}$ on the W bus 84. Decision block 76B-A tests the XB register 58 bit 0 which indicates a left byte when at logical ZERO and a right byte when at logical ONE.

Block 36D transfers the right word stored in register DB 31 to register B0. In this case, the half word is in the left byte position. The shifter 19 swaps the left byte position and the right byte position. Also, register D0 stores $00FF_{16}$ to mask out the left byte position in the DALU 15. Register B0 now stores the half word in the right byte position. Decision block 36D-A checks the sign bit on bit position 16 of the I bus 14 which if at logical ZERO indicating a positive sign or an extended ZERO field, then the firmware branches to the execute routine. If the sign bit is at logical ONE, then decision block 12B tests signal FPRM07+ which is at logical ONE for signed operands and logical ZERO for unsigned operands. If signal FPRM07+ is at logical ZERO indicating an unsigned operand, then the firmware branches to an execute routine. If signal FPRM07+ indicates a signed operand, then register A0 must be set to binary ONE's.

Block 12C forces all binary ONE's in the left byte position of register B0 by OR'ing register B0 with $00FF00_{16}$.

Block 133 forces all binary ONE's into register A0 and the firmware branches to an execute routine.

If in decision block 76B-A signal XB(0) indicated a right byte, then block 76D masked off the left byte position of the word by $FF00_{16}$ or $00FF_{16}$ stored in register D0 and stored the half word in the right byte position of register B0. Decision block 76D-A tests bit position 24 of I bus 14 which, if at logical ZERO indicating a positive sign or a ZERO bit extension, branches to the execute routine. Signal IBUS 24+ at logical ONE causes a branch to decision block 12B to test for a signal or unsigned operand as described supra.

Figure 14:
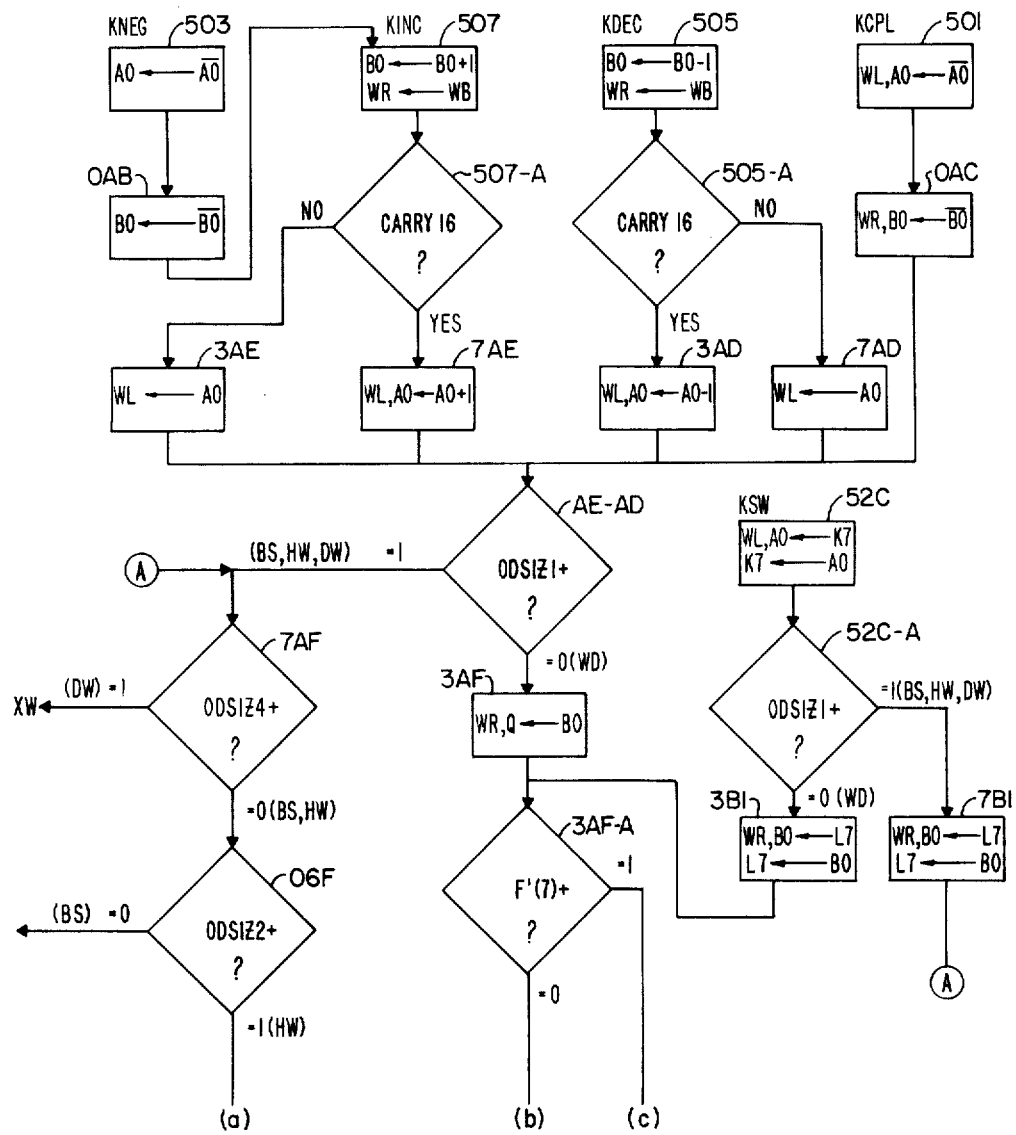
FIG. 14 is a flow diagram of the firmware processing representative extended integer instructions.
Figure 14:
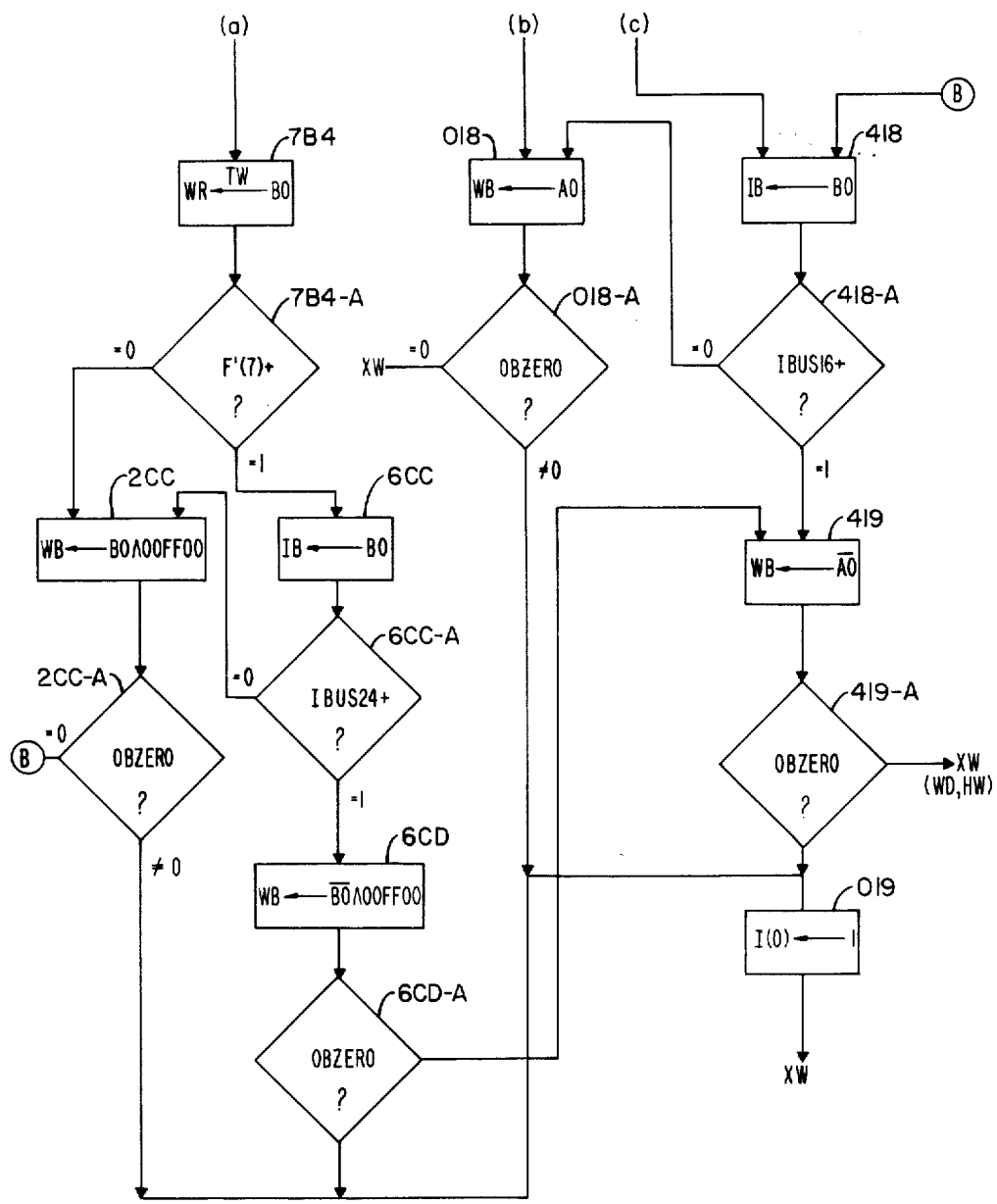

Referring to FIG. 14, block 507 starts the execution of the EII increment instruction KINC. The 16-bit left portion of the operand is stored in register A0 and the 16-bit right portion of the operand is stored in register B0.

Block 507 adds binary ONE's to the right portion of the operand stored in register B0 and stores the result in register B0 and also stored in bit positions 16 through 31 of the W register 28. Block 507-A tests the carry bit out of bit position 16 of the DALU 15. If there is no carry, then block 3AE stores the left portion of the operand in bit positions 0 through 15 of the W register 28. If there is a carry, then block 7AE increments register A0 and stores the left portion of the operand in bit positions 0 through 15 of the W register 28.

The execution of the EII decrement instruction KDEC starts in block 505. Register B0 is decremented and stored in the right portion of the W register 28. Bit position 16 of the DALU 15 is tested for a carry in decision block 505-A. If there is a carry, then block 3AD decrements register A0 and stores the result in the left portion of the W register 28. If there is no carry, then in block 7AD the contents of register A0 are stored in the left portion of W register 28.

The execution of the EII negate instruction KNEG subtracts the operand from ZERO by complementing the operand bits and then incrementing the operand. Block 503 complements register A0. Block 0AB complements register B0. The increment of the result is then performed as described supra.

The execution of the EII complement instruction KCPL complements the contents of register A0 and stores the complemented result in the left portion of W register 28. Block 0AC complements the contents of register B0 and stores the complemented result in the right portion of W register 28.

In the execution of these instructions, the resulting operand is stored in registers A0, B0 and W (WL indicating the left portion and WR indicating the right portion of the W register 28).

Decision block AE-AD starts the post-processing of the EII instruction by testing data type signal ODSIZ1+ which if at logical ONE indicates a bit string, half word or double word operand and at logical ZERO indicates a word operand. Decision block 7AF tests signal ODSIZ4+ which at logical ONE indicates a double word operand which branches to an XW routine. Signal ODSIZ4+ at logical ZERO indicates a bit string or half word operand. Decision block 0GF tests signal ODSIZ2+ which at logical ZERO indicates a bit string and at logical ONE indicates a half word. Further bit string processing is not described.

Block 7B4 processes the half word by twinning and storing it in both bit positions 16 through 23 and 24 through 31 in W register 28 from the B0 register. This prepares the half word during a memory write operation for transfer to either the left or right byte position of the word location in memory 106. Decision block 7B4-A tests signal F'(7)+ for a signed or unsigned operand.

If unsigned, block 2CC tests the left byte position of the right half of register B0 for all ZERO's by AND'ing register B0 with 00FF00 and putting the result on the W bus 84. Decision block 2CC-A tests the O bus 17 for all ZERO's. Note that information from register B0 is sent to the W bus 84 via R bus 13, DALU 15 where the AND'ing operation is performed, selector 20, O bus 17 and shifter 19. If the result does not equal ZERO, then block 019 sets the overflow bit 0 in I register 57 and branches to the XW routine. If the result equals ZERO, it is necessary to test the left half of the operand for all ZERO's. This assures that the half word was ZERO extended or positive sign extended.

Block 418 transfers the contents of register B0 onto the I bus 14 where decision block 418A tests the sign bit IBUS 16+. Since it is logical ZERO, this was tested in decision block 2CC-A and block 018 then transfers the contents of the A register onto W bus 84. The O bus 17 signals are tested for ZERO and if ZERO the firmware branches to the XW routine. If the O bus 17 signals are not ZERO, then the overflow bit 0 is set in I register 57 in block 019, and then the firmware branches to the XW routine.

If decision block 7B4-A indicates a signed operand, then in block 6CC the contents of register B0 are placed on the I bus 14 and decision block 6CC-A tests the sign bit IBUS 24+. If the sign bit is logical ZERO, then block 2CC masks the left byte and transfers the contents of register B0 onto the W bus 84. Decision block 2CC-A again checks the O bus 17 for all ZERO's as described infra. If the sign bit signal IBUS 24+ is logical ONE, then block 6CD complements register B0 and masks it by 00FF00$_{16}$. Decision block 6CD-A tests for all ZERO's and branches to the XW routine if all ZERO's or sets the complement bit in block 019.

Decision block AE-AD signal ODSIZ1+ at logical ZERO indicates a word operand which in block 3AF is stored in the right word position of the W register 21 and in the Q register 50. Decision block 3AF-A tests signal F'(7)+ which indicates a signed operand if at logical ONE and an unsigned operand if at logical ZERO.

Block 018 places the contents of register A0 on the W bus 84 and decision block 018-A checks that the information on the O bus 17 is all ZERO's. If so, the firmware branches to execute the instruction. If the O bus 17 signals do not indicate all ZERO's, then block 019 sets the overflow signal in the I register 57.

The execution of the swap instruction KSW wherein the contents of registers A0 and K7 are swapped and the contents of registers B0 and L7 are swapped starts in block 52C. Registers K7 and L7 are in DRAM 11.

Block 52C transfers the contents of register K7 into register A0 and the left word position of the W register 28, and transfers the contents of the A0 register into register K7. Decision block 52C-A tests signal ODSIZ1+ which if at logical ZERO indicates a word operand and branches to block 3B1, and if a logical ONE indicates a bit string, half word or double word operand and branches to block 7B1.

Block 3B1 transfers the contents of register L7 to register B0 and to the right word position of W register 28, and transfers the contents of register B0 to register L7. Decision block 3AF-A tests signal F'(7)+ for unsigned or signed operands as described supra, checks for the correct extended bits and tests for overflow.

Block 3B1 performs the same swap between registers L7 and B0 as does block 7B1 and decision block 7AF. Signal ODSIZ4+ at logical ONE indicates a double word operand and branches to an XW routine. Signal ODSIZ4+ at logical ZERO calls for decision block 06F. The sequence is described supra.

The XW routine which is not described stores the operand in a register or in memory 106 and calls for the next instruction.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes a memory subsystem which stores instructions and operands and a central processor unit (CPU) which receives said instructions and said operands from said memory subsystem and executes said instructions, one of said instructions includes a first word and a second word, said first word includes an operation code field for identifying said one of said instructions said CPU will execute, and an escape code field for identifying a class of instruction including extended integer instructions (EII) and commercial instruction processor (CIP) instructions, said second word includes a data type field for identifying an operand type and an address syllable field which in conjunction with said escape code field generates an effective address, said CPU comprising:

a control store means having locations for storing a plurality of microwords and generating a plurality of control store signals for each of said plurality of microwords for controlling the operation of said CPU;

register means responsive to a first plurality of said control store signals for storing signals received from said memory subsystem representative of said data type field; and read only memory means coupled to said register means and said control store means and responsive to a first operation code signal, a first control store signal and a second control store signal, and said data type field signals for generating a plurality of operand size signals; and multiplexer means responsive to a second plurality of said control store signals and said plurality of operand size signals for generating a test signal representative of a selected one of said plurality of operand size signals, said control store means being responsive to said test signal for branching to the location of the next one of said microwords for generating the next plurality of control store signals.

2. The processor of claim 1 wherein said read only means comprises:

a read only memory having a plurality of input address terminals and an enable terminal, said enable terminal being responsive to a third control store signal indicative of said EII and said CIP instruction for enabling said read only memory;

said input address terminals being responsive to said data type field signals and said first operation code signal in a first state indicative of an EII operand for generating said plurality of operand size signals representative of said EII operand, and responsive to said first operation code signal in a second state indicative of a CIP instruction operand and said data type field signals for generating said plurality of operand signals representative of said CIP instruction operand.

3. The processor of claim 2 wherein said read only memory input address terminals are further responsive to a fourth control store signal in a first state indicative of said operand being stored in said memory subsystem, and responsive to said fourth control store signal in a second state indicative of said operand being stored in a plurality of registers, and responsive to said data type field signals for generating said operand size signals representative of said operand being stored in said memory subsystem or said plurality of registers respectively.

4. The processor of claim 3 wherein said read only memory input address terminals are further responsive to said fourth control store signal in said second state, a fifth control store signal in a first state and said data type field signals for generating said operand size signals indicative of the size of said operand being stored in a first register.

5. The processor of claim 4 wherein said read only memory input address terminals are further responsive to said fourth control store signal in said second state, a fifth control store signal in a second state and said data type field signals for generating said operand size signals indicative of the size of said operand being stored in a second register.

* * * * *